(12) United States Patent
Shimosato et al.

(10) Patent No.: US 7,756,270 B2
(45) Date of Patent: Jul. 13, 2010

(54) ENCRYPTION DEVICE AND DECRYPTION DEVICE

(75) Inventors: Tsutomu Shimosato, Kanagawa (JP); Yujiro Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 1343 days.

(21) Appl. No.: 10/483,136

(22) PCT Filed: May 7, 2003

(86) PCT No.: PCT/JP03/05677

§ 371 (c)(1),
(2), (4) Date: Mar. 25, 2005

(87) PCT Pub. No.: WO03/096609

PCT Pub. Date: Nov. 20, 2003

(65) Prior Publication Data

US 2005/0169470 A1    Aug. 4, 2005

(30) Foreign Application Priority Data

May 10, 2002    (JP)    ............................... 2002-135044

(51) Int. Cl.
*H04L 9/00* (2006.01)
(52) U.S. Cl. ......................................... 380/43; 713/181
(58) Field of Classification Search .................. 380/278, 380/201, 213, 2, 43; 713/189, 181
See application file for complete search history.

(56) References Cited

U.S. PATENT DOCUMENTS 6,570,990 B1 * 5/2003 Kohn et al. .................. 380/213

7,162,642 B2 * 1/2007 Schumann et al. .......... 713/189

(Continued)

FOREIGN PATENT DOCUMENTS

JP    8 163119    6/1996

(Continued)

OTHER PUBLICATIONS

Sakurai, M. ; A transport stream processor for HDD recording and playback of HDTV signal; Publication Date: Nov. 2002; INSPEC; vol. 48; On pp. 810-815.*

(Continued)

*Primary Examiner*—Kambiz Zand
*Assistant Examiner*—Monjour Rahim
(74) *Attorney, Agent, or Firm*—Frommer Lawrence & Haug LLP; William S. Frommer; Thomas F. Presson

(57) ABSTRACT

An apparatus for enciphering data by which enciphered digital information data with improved cipher strength are obtained by subjecting digital information data to enciphered process responding to random number data or pseudo-random number data produced in accordance with key data, and which comprises an enciphering portion for subjecting an HD signal to enciphering process to produce an enciphered HD signal, a cipher producing portion for producing, in response to key data, a cipher data from which random number data or pseudo-random number data are obtained to be supplied to the enciphering portion, a register for supplying the cipher producing portion with input data, and a line number data extracting portion for extracting line number data from the HD signal to be supplied to the register as initial data.

42 Claims, 18 Drawing Sheets

U.S. PATENT DOCUMENTS

| | | | |
|---|---|---|---|
| 7,242,766 B1 * | 7/2007 | Lyle | 380/2 |
| 7,280,659 B2 * | 10/2007 | Watanabe et al. | 380/46 |
| 2002/0037081 A1 * | 3/2002 | Rogoff et al. | 380/278 |
| 2002/0141582 A1 * | 10/2002 | Kocher et al. | 380/201 |

FOREIGN PATENT DOCUMENTS

| | | |
|---|---|---|
| JP | 8-163119 | 6/1996 |
| JP | 8 186547 | 7/1996 |
| JP | 8-186547 | 7/1996 |
| WO | WO 03 096610 | 11/2003 |

OTHER PUBLICATIONS

Tatsuaki Okamoto, Hiroshi Yamamoto, "Series/Joho Kagaku no Sugaku, Gendai Ango", Sangyo Tosho Kabushiki Kaisha, Jun. 30, 1998, $2^{nd}$ print, pp. 73 to 77.

Tatsuaki Okamoto et al., "Series/mathematics of information science modern encryption", Japan, SangyoTosho Co., Ltd., Jun. 30, 1998, First version, second print, p. 73-77.

* cited by examiner

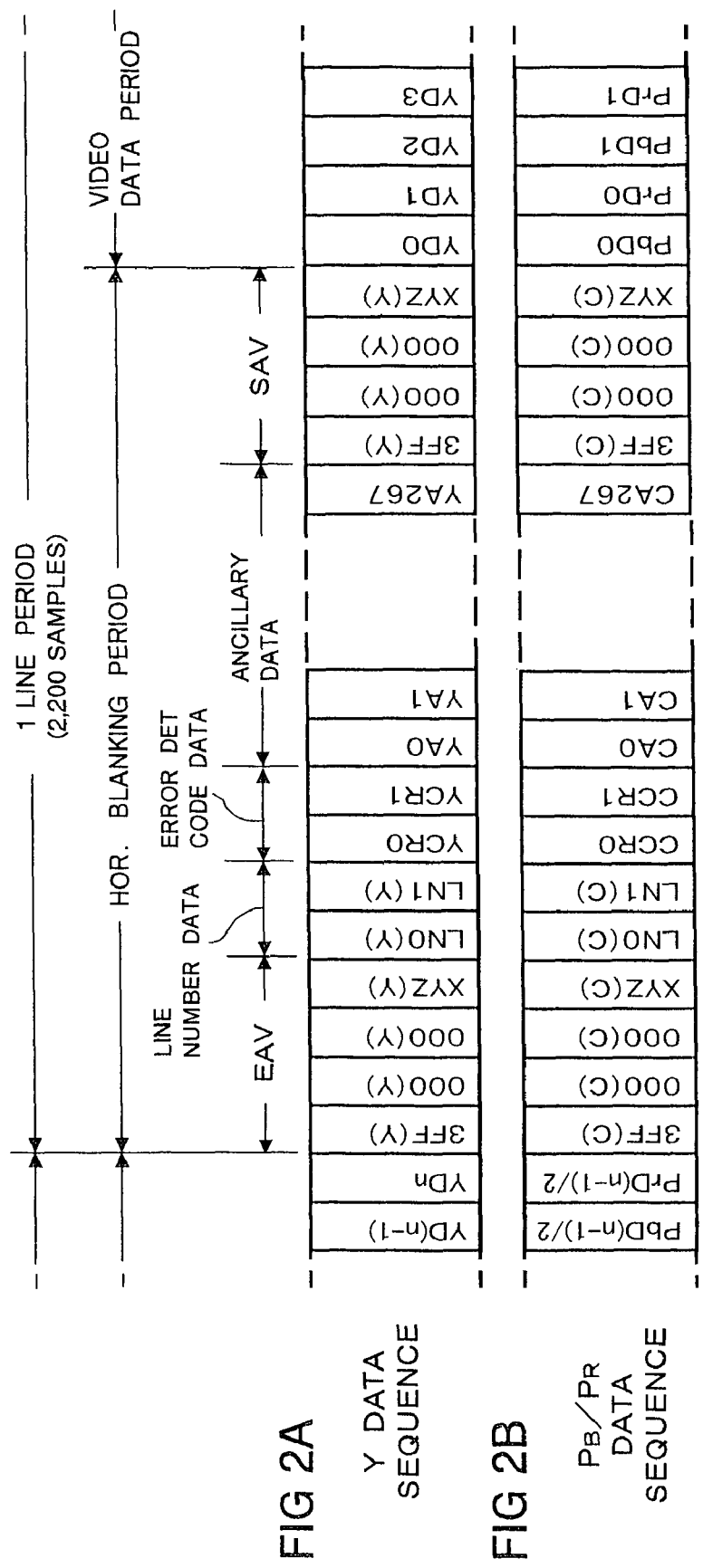
FIG 2A Y DATA SEQUENCE
FIG 2B P_B/P_R DATA SEQUENCE

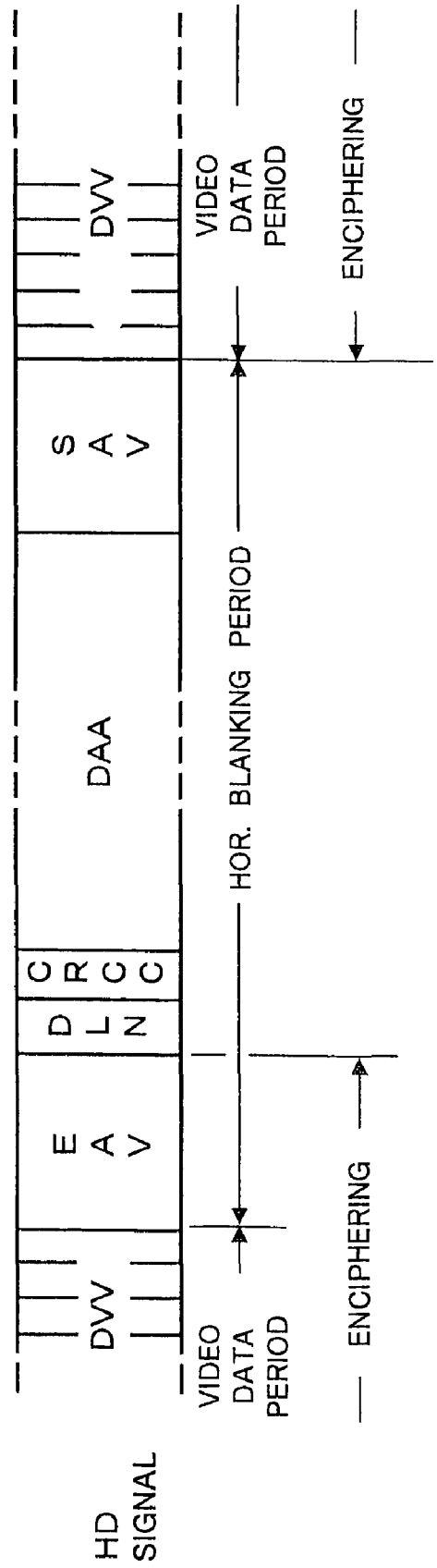

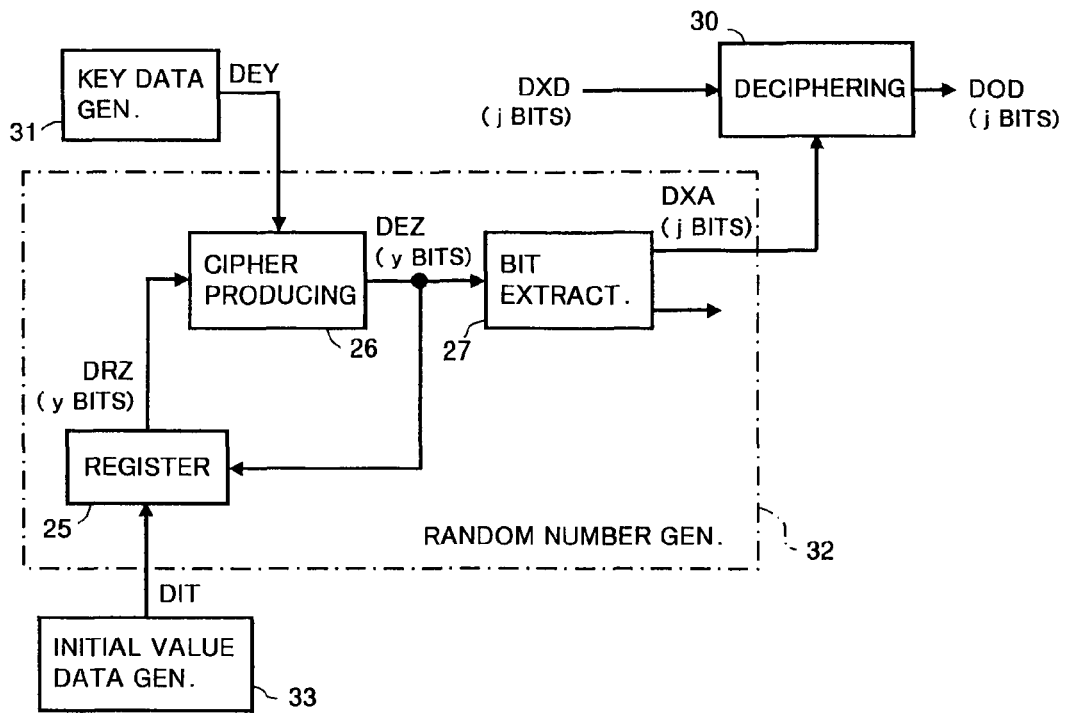
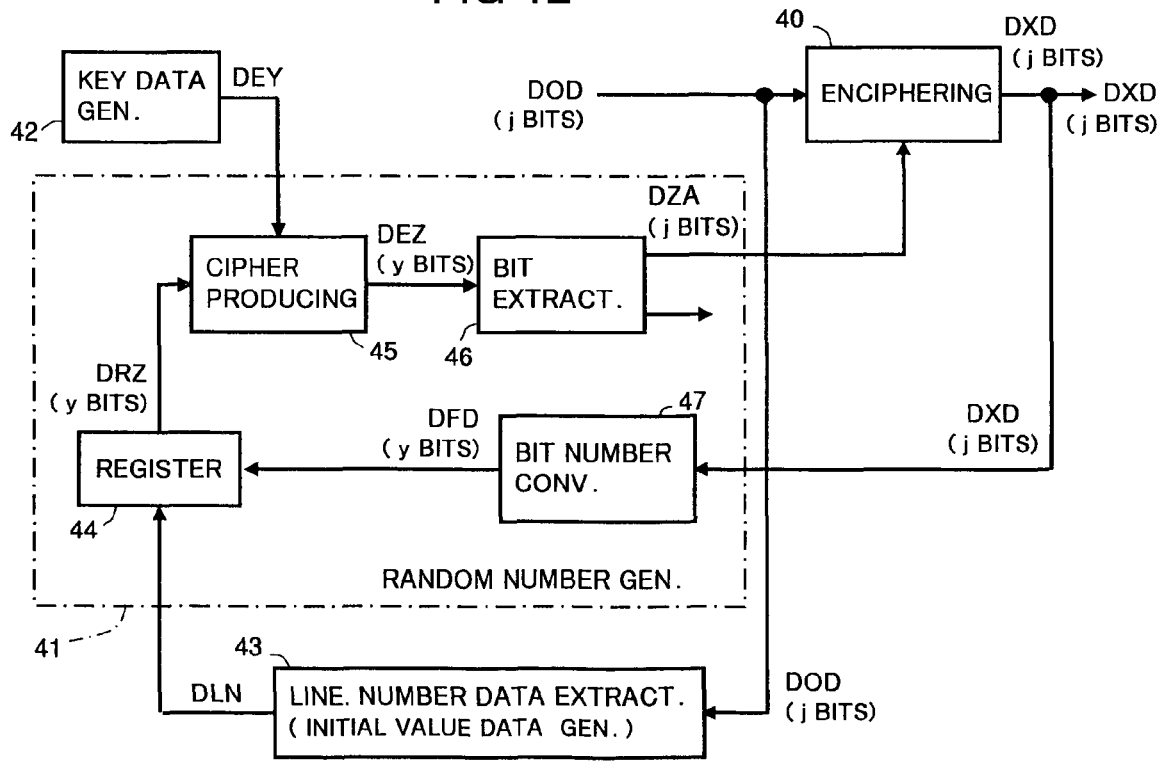

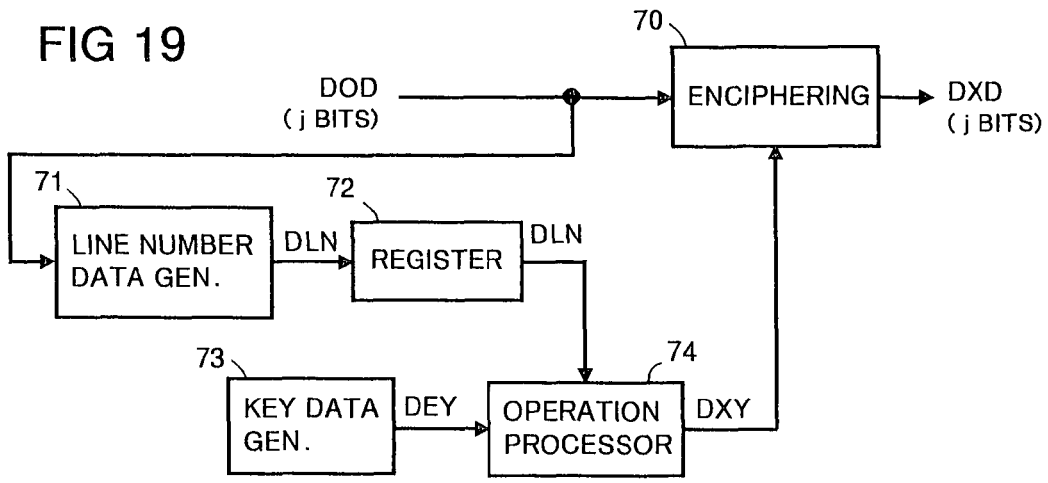
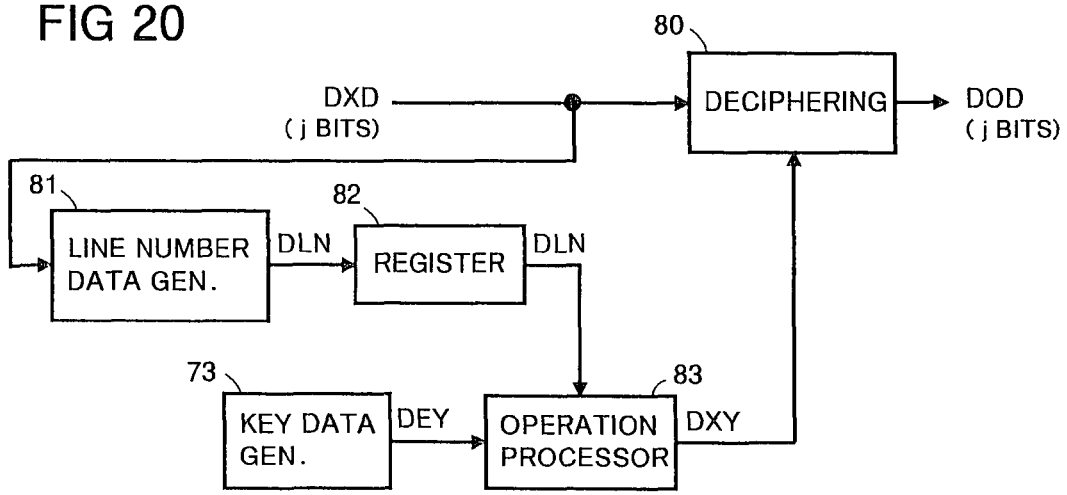
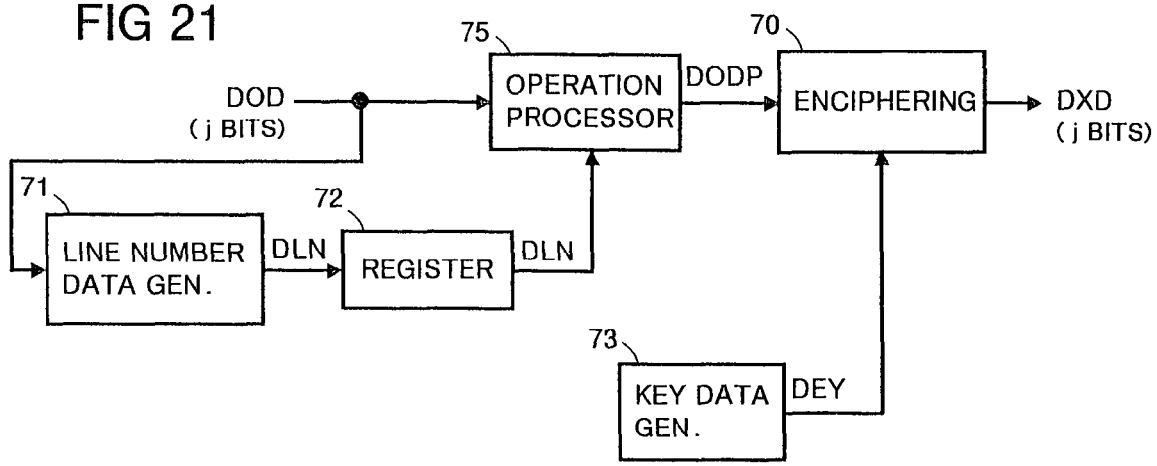

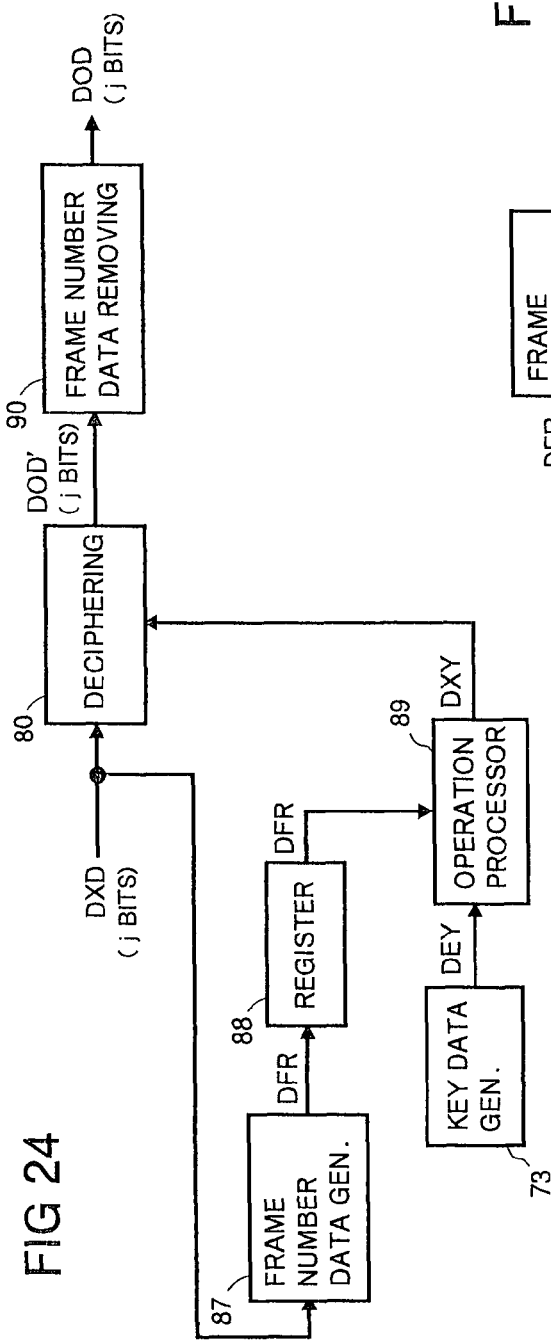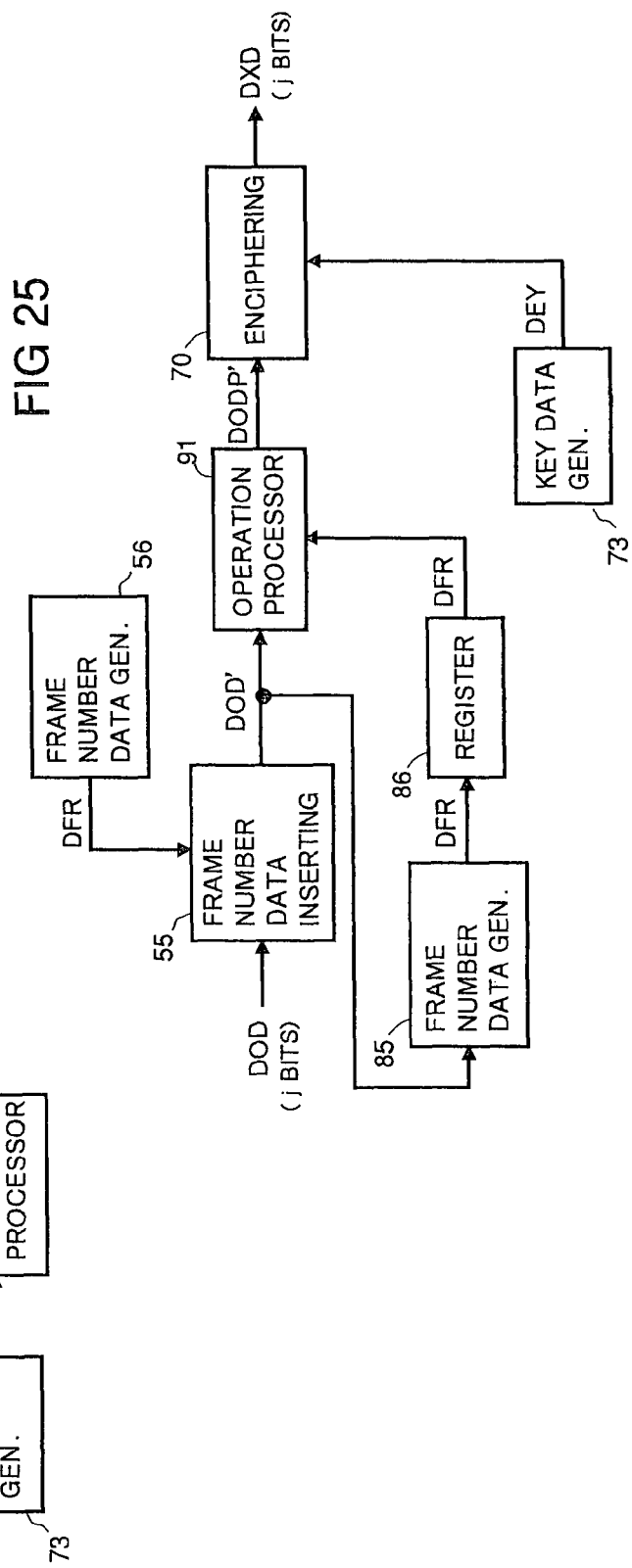

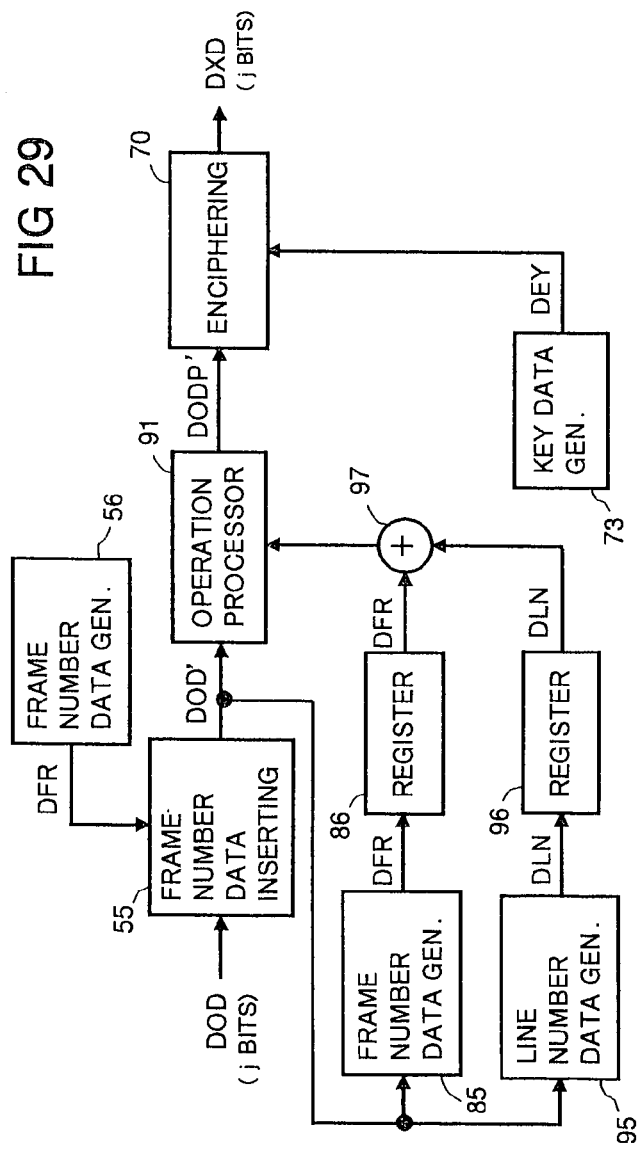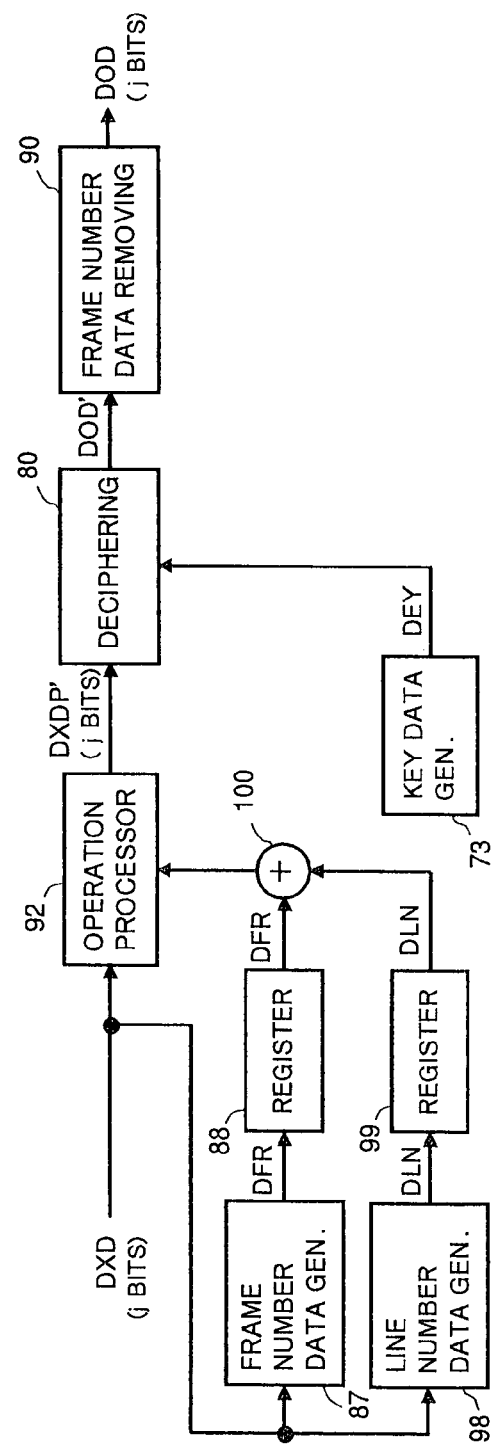

ENCRYPTION DEVICE AND DECRYPTION DEVICE

TECHNICAL FIELD

The present invention relates to each of an apparatus for enciphering data which subjects digital information data to enciphering process for producing enciphered digital information data and an apparatus for deciphering data which subjects enciphered digital information data to deciphering process for reproducing original digital information data.

TECHNICAL BACKGROUND

In the field of data transmission by which digital data representing various kinds of signal information are transmitted, there have been proposed to subject digital data set to be transmitted to enciphering process at a transmission side and to reproduce original data by subjecting the enciphered digital data to deciphering process at a receiving side, in order to prevent the digital data from being eavesdropped on a data transmission line. One of typical algorisms for enciphering digital data is the DES (Date Encryption Standard) published in 1977 by the National Bureau of Standards, the United State of America.

With cipher-transmission based on the DES, digital data are enciphered in accordance with rules determined by enciphering key data prepared previously to produce enciphered digital data and the enciphered digital data are deciphered in accordance with rules determined by deciphering key data prepared previously to reproduce original digital data. The deciphering key data are prepared to be the same as the enciphering key data so that each of the deciphering key data and the enciphering key data are formed with common data. The algorisms for enciphering and deciphering have been opened to the public and the common key data are kept secret for the purpose of enciphering.

FIG. 1 shows a basic structure of a cipher-transmission system according to the DES. In the basic structure shown in FIG. 1, digital data to be transmitted are supplied to a DES enciphering portion 11 as original data. Enciphering key data prepared previously are also supplied to the DES enciphering portion 11. In the DES enciphering portion 11, the original data are subjected to the DES enciphering process in accordance with the rules determined by the enciphering key data to produce enciphered data. The enciphered data obtained from the DES enciphering portion 11 are transmitted through a data transmission line 12 having one end thereof connected with the DES enciphering portion 11.

The enciphered data having been transmitted through the data transmission line 12 are supplied to a DES deciphering portion 13 with which the other end of the data transmission line 12 is connected. Deciphering key data which is the same as the enciphering key data are also supplied to the DES deciphering portion 13. In the DES deciphering portion 13, the enciphered data are subjected to the DES deciphering process in accordance with the rules determined by the deciphering key data to reproduce the original data.

In the field of video signals, digitalization of video signals has been aimed for actualizing diversification in information to be transmitted, improvements in quality of images reproduced from the video signal and so on. For example, there has been proposed the High Definition Television (HDTV) system which uses a digital video signal composed of digital word sequence data representing video signal information. The digital video signal under the HDTV system (hereinafter, referred to the HD signal) is formed in accordance with, for example, the BTA S-002 which is one of a series of standards established by the Broadcasting Technology Association (BTA) in Japan so as to be in the form of Y and $P_B/P_R$ signals or G, B and R signals. In the case of the Y and $P_B/P_R$ signals, Y represents a luminance signal and $P_B/P_R$ represent color difference signals. In the case of the G, B and R signals, G, B and R represent green, blue and red primary color signals, respectively.

The HD signal is a digital television signal by which each frame picture is formed with first and second field pictures each appearing at a rate of 60 Hz and which is constituted in accordance with an arrangements including a frame rate of 30 Hz, 1125 lines per frame, 2,200 data samples per line and a sampling frequency of 74.25 MHz. For example, the HD signal in the form of Y and $P_B/P_R$ signals is constituted in accordance with such data formats as shown in FIGS. 2A and 2B.

The data formats shown in FIGS. 2A and 2B include a part of a portion corresponding to a line period (hereinafter, referred to a line period portion) of a luminance signal data sequence (hereinafter, referred to a Y data sequence) as shown in FIG. 2A, which represents a luminance signal component of a video signal, and a part of a line period portion of a color difference signal data sequence (hereinafter, referred a $P_B/P_R$ data sequence) as shown in FIG. 2B, which represents color difference signal components of the video signal. Each of data words constituting the Y data sequence or the $P_B/P_R$ data sequence is composed of 10 bits. This means that each of the Y data sequence and the $P_B/P_R$ data sequence constitutes 10-bit word sequence data having a word transmission rate of, for example, 74.25 Mwps.

In the Y data sequence, each line period portion of which is formed with a portion corresponding to a horizontal blanking period and a portion corresponding to a video data period appearing after the horizontal blanking period, time reference code data SAV (Start of Active Video) which are composed of four 10-bit words (3FF(Y), 000(Y), 000(Y), XYZ(Y); 3FF and 000 are hexadecimal numbers and (Y) indicates a word contained in the Y data sequence) are provided just before the portion corresponding to the video data period and another time reference code data EAV (End of Active Video) which are composed of four 10-bit words (3FF(Y), 000(Y), 000(Y), XYZ(Y)) are provided just after the portion corresponding to the video data period. Similarly, in the $P_B/P_R$ data sequence, each line period portion of which is formed with a portion corresponding to a horizontal blanking period and a portion corresponding to a video data period appearing after the horizontal blanking period, time reference code data SAV which are composed of four 10-bit words (3FF(C), 000(C), 000(C), XYZ(C); (C) indicates a word contained in the $P_B/P_R$ data sequence) are provided just before the portion corresponding to the video data period and another time reference code data EAV which are composed of four 10-bit words (3FF(C), 000(C), 000(C), XYZ(C)) are provided just after the portion corresponding to the video data period. The time reference code data EAV and SAV contained in the Y data sequence are provided in the portion corresponding to the horizontal blanking period of the Y data sequence and the time reference code data EAV and SAV contained in the $P_B/P_R$ data sequence are provided in the portion corresponding to the horizontal blanking period of the $P_B/P_R$ data sequence.

Initial three 10-bit words (3FF, 000, 000) of four 10-bit words (3FF, 000, 000, XYA), each of which is shown with (Y) or (C), are used for establishing word synchronization or line synchronization and a last one 10-bit word (XYZ) of four 10-bit words (3FF, 000, 000, XYA), which is also shown with (Y) or (C), is used for discriminating the first field from the second field in each frame or for discriminating the time reference code data EAV from the time reference code data SAV.

Line number data LN0(Y) and LN1(Y) or LN0(C) and LN1 (C) which represent a line number of each of lines constituting each frame, error detecting code data YCR0 and YCR1 or CCR0 and CCR1 and ancillary data YA0, YA1, ..., YA267 or CA0, CA1, ... CA267 which include audio data and so on are provided between the time reference code data EAV and the time reference code data SAV in each horizontal blanking period of each of the Y data sequence and the $P_B/P_R$ data sequence.

When the HD signal constituted with the Y data sequence and the $P_B/P_R$ data sequence is subjected to transmission through a data transmission line, it is desired for the HD signal to be converted to serial data from word sequence data so as to be subjected to serial transmission through a simplified data transmission line. In connection with the serial transmission of the HD signal constituted with the Y data sequence and the $P_B/P_R$ data sequence, it has been standardized to transmit the HD signal in conformity with the HD SDI (High Definition Serial Digital Interface) according to the BTA S-004 which is one of a series of standards established by the BTA in Japan.

In the transmission of the HD signal in conformity with the HD SDI, the Y data sequence and the $P_B/P_R$ data sequence are multiplexed, with their portions corresponding to the horizontal blanking periods in each of which the time reference code data EAV and SAV are provided and which synchronize with each other, to produce a multiple word sequence as shown in FIG. 3 and then the multiple word sequence is converted to serial data to be transmitted. Each of data words constituting the multiple word sequence shown in FIG. 3 is composed of 10 bits and the word transmission rate of the multiple word sequence shown in FIG. 3 is set to be 74.25 Mwps×2=148.5 Mwps. In the multiple word sequence thus obtained as shown in FIG. 3, multiple time reference code data (multiple SAV) which are composed of eight 10-bit words (3FF(C), 3FF(Y), 000(C), 000(Y), 000(C), 000(Y), XYZ(C), XYZ(Y)) are provided just before the portion corresponding to a video data period and another multiple time reference code data EAV (multiple EAV) which are composed of eight 10-bit words (3FF(C), 3FF(Y), 000(C), 000 (Y), 000(C), 000(Y), XYZ(C), XYZ(Y)) are provided just after the portion corresponding to the video data period.

The each of the 10-bit words constituting the multiple word sequence is sent bit by bit from the least significant bit (LSB) to the most significant bit (MSB) so that the multiple word sequence is converted to a serial data. Then, the serial data is subjected to scrambling process to produce a serial transmission HD signal (hereinafter, referred to an HD-SDI signal) and the HD-SDI signal is transmitted through a data transmission line. The HD-SDI signal thus transmitted has a bit transmission rate of, for example, 148.5 Mwps×10=1.485 Gbps.

In the case of the transmission of the HD-SDI signal through the data transmission line, it is also desired to subject the HD-SDI signal to enciphering process at a transmission side and to reproduce original HD-SDI data by subjecting the enciphered HD-SDI data to deciphering process at a receiving side, in order to prevent the HD-SDI data from being eavesdropped on the data transmission line. Such cipher-transmission of the HD-SDI signal can be theoretically carried out with a cipher-transmission system which is similar to the cipher-transmission system according to the DES having the basic structure shown in FIG. 1.

For example, when an HD signal is converted to an HD-SDI signal in accordance with the HD SDI to be transmitted through a data transmission line and the transmitted HD-SDI signal is reconverted to the HD signal in accordance with the HD SDI to be supplied to, for example, a video projector which operates to display images based on the HD signal, it is considered to have such a cipher-transmission system as shown in FIG. 4 for conducting the cipher-transmission of the HD-SDI signal.

In the cipher-transmission system shown in FIG. 4, an HD-SDI signal DHS derived from an HD-SDI signal generating portion 15, in which an HD signal obtained from a video camera or the like is converted to the HD-SDI signal DHS in accordance with the HD SDI, is supplied to an HD-SDI enciphering portion 16. Key data DEK prepared previously are also supplied to the HD-SDI enciphering portion 16. In the HD-SDI enciphering portion 16, the HD-SDI signal DHS is first subjected to serial to parallel (S/P) conversion to reproduce the original HD signal constituted with Y and $P_B/P_R$ data sequences and the reproduced HD signal is subjected to the DES enciphering process in accordance with the rules determined by the key data DEK to produce an enciphered HD signal. Then, in the HD-SDI enciphering portion 16, the enciphered HD signal is subjected to parallel to serial (P/S) conversion to produce enciphered serial data DHSE.

When the enciphered HD signal is produced by subjecting the HD signal to the DES enciphering process, for example, video data DVV which are provided in a portion corresponding to a video data period and time reference code data EAV which are provided in a starting end of a portion corresponding to a horizontal blanking period successive to the portion corresponding to the video data portion in a portion corresponding to a line period of an HD signal constituted with Y and $P_B/P_R$ data sequences shown in FIGS. 2A and 2B, as shown in FIG. 5, are subjected to the DES enciphering process to produce an enciphered video data. On the other hand, various data provided in the portion corresponding to the horizontal blanking period except the time reference code data EAV, that is, line number data DLN representing a line number varying line by line, error detecting code data CRCC, ancillary data DAA including audio data, and time reference code data SAV, are not subjected to the DES enciphering process but combined with the enciphered video data. As a result, the enciphered HD signal which contains the various data provided in the portion corresponding to the horizontal blanking period except the time reference code data EAV and the enciphered video data successive to the various data is obtained.

The enciphered serial data DHSE are sent from the HD-SDI enciphering portion 16 to be transmitted through a data transmission line 17 having one end thereof connected with the HD-SDI enciphering portion 16.

The enciphered serial data DHSE having been transmitted through the data transmission line 17 are supplied to an HD-SDI deciphering portion 18 with which the other end of the data transmission line 17 is connected. Key data DEK which is the same as the key data DEK supplied to the HD-SDI enciphering portion 16 are also supplied to the HD-SDI deciphering portion 18. In the HD-SDI deciphering portion 18, the enciphered serial data DHSE are subjected to the S/P conversion to reproduce the enciphered HD signal constituted with the enciphered Y and $P_B/P_R$ data sequences each containing the enciphered video data and the HD signal is subjected to the DES deciphering process in accordance with the rules determined by the key data DEK to reproduce the original HD signal constituted with Y and $P_B/P_R$ data sequences.

When the HD signal constituted with Y and $P_B/P_R$ data sequences is reproduced by subjecting the enciphered HD signal to the DES deciphering process, for example, the enciphered video data in the portion corresponding to the horizontal blanking period of the enciphered HD signal are subjected to the DES deciphering process to reproduce the original video data DVV and time reference code data EAV. On the other hand, the various data provided in the portion corresponding to the horizontal blanking period except the time reference code data EAV, that is, the line number data DLN representing the line number varying line by line, the error detecting code data CRCC, the ancillary data DAA including the audio data, and the time reference code data SAV, are not subjected to the DES deciphering process but extracted as they are to be combined with the reproduced video data and time reference code data EAV. As a result, the original HD signal as shown in FIG. 5 is obtained.

Then, in the HD-SDI deciphering portion 18, the Y and $P_B/P_R$ data sequences constituting the reproduced HD signal are multiplexed with each other in accordance with the HD SDI to produce a word multiple data sequence and the word multiple data sequence thus obtained are subjected to the P/S conversion to reproduce the HD-SDI signal DHS. The HD-SDI signal DHS obtained from the HD-SDI deciphering portion 18 is supplied to a video projector 19. In the video projector 19, the HD signal is reproduced from the HD-SDI signal DHS and used for display of images.

There have been proposed such enciphering circuits as shown in FIGS. 6, 8 and 10 to be used in the HD-SDI enciphering portion 16 shown in FIG. 4 for subjecting the portion of the HD signal in which the video data DVV and the time reference code data EAV are contained to the DES enciphering process in accordance with the rules determined by the key data DEY and further proposed such deciphering circuits as shown in FIGS. 7, 9 and 11 to be used in the HD-SDI deciphering portion 18 shown in FIG. 4 for subjecting the portion of the enciphered HD signal in which the enciphered video data are contained to the DES deciphering process in accordance with the rules determined by the key data DEY.

The enciphering circuit shown in FIG. 6 is constituted with an enciphering portion 20 to which digital information data DOD in the form of j-bit word sequence data (j represents a positive integer) are supplied as input data and a key data generator 21 operative to supply the enciphering portion 20 with key data DEY. In the enciphering portion 20, the digital information data DOD are subjected to enciphering process in accordance with the rules determined by the key data DEY to produce enciphered digital information data DXD in the form of j-bit word sequence data. The enciphered digital information data DXD are sent from the enciphering portion 20.

The enciphering circuit shown in FIG. 8 is constituted with an enciphering portion 20 to which digital information data DOD in the form of j-bit word sequence data (j represents a positive integer) are supplied as input data, a key data generator 21 operative to send key data DEY, a random number generator 22 and an initial value data generator 23 operative to supply the random number generator 22 with initial value data DIT. The key data DEY obtained from the key data generator 21 are supplied to the random number generator 22.

In the random number generator 22, a register 25 produces register output data DRZ composed of y-bit words (y represents a positive integer larger than j) in response to input data and supplies a cipher producing portion 26 with the register output data DRZ. The initial value data DIT obtained from the initial value data generator 23 are supplied to the register 25.

In the cipher producing portion 26 to which the key data DEY obtained from the key data generator 21 are supplied, the register output data DRZ obtained from the register 25 are subjected to enciphering process in accordance with the rules determined by the key data DEY to produce cipher data DEZ composed of y-bit words. The cipher data DEZ are sent from the cipher producing portion 26 to a bit extracting portion 27. In the bit extracting portion 27, j bits of each of the y-bit words constituting the cipher data DEZ are extracted successively to produce pseudo-random number data DXA composed of i-bit words. The pseudo-random number data DXA obtained from the bit extracting portion 27 are sent from the random number generator 22 to be supplied to the enciphering portion 20.

Incidentally, the random number generator 22 may produce genuine random number data in place of the pseudo-random number data DXA. In such a case, the genuine random number data are sent from the random number generator 22 to be supplied to the enciphering portion 20.

In the enciphering portion 20, the digital information data DOD are subjected to enciphering process responding to the pseudo-random number data DXA or the genuine random number data obtained from the random number generator 22 to produce enciphered digital information data DXD in the form of j-bit word sequence data. The enciphered digital information data DXD thus obtained on the basis of the digital information data DOD are sent from the enciphering portion 20.

The enciphered digital information data DXD sent from the enciphering portion 20 are supplied to a bit number converting portion 28 in the random number generator 22. In the bit number converting portion 28, the enciphered digital information data DXD are converted to feedback data DFD in the form of y-bit word sequence data. The feedback data DFD obtained from the bit number converting portion 28 are fed back to the register 25 as the input data.

The register 25 is operative first to send the register output data DRZ obtained in response to the initial value data DIT obtained from the initial value data generator 23 and then to send the register output data DRZ obtained in response to the feedback data DFD obtained from the bit number converting portion 28.

The enciphering circuit shown in FIG. 10 is constituted in almost the same manner as the enciphering circuit shown in FIG. 8 but any portion corresponding to the bit number converting portion 28 shown in FIG. 8 is not provided in a random number generator 22. With such arrangements, enciphered digital information data DXD obtained from an enciphering portion 20 are not supplied to the random number generator 22 and cipher data DEZ obtained from a cipher producing portion 26 are supplied to a bit extracting portion 27 and further fed back to a register 25 as input data in the enciphering circuit shown in FIG. 10. The overall operation of the enciphering circuit shown in FIG. 10 is almost the same as that of the enciphering circuit shown in FIG. 8.

The deciphering circuit shown in FIG. 7 is constituted with a deciphering portion 30 to which the enciphered digital information data DXD in the form of i-bit word sequence data obtained from the enciphering circuit shown in FIG. 6 are supplied as input data and a key data generator 31 operative to supply the deciphering portion 30 with key data DEY. In the deciphering portion 30, the enciphered digital information data DXD are subjected to deciphering process in accordance with the rules determined by the key data DEY to reproduce the original digital information data DOD in the form of j-bit word sequence data. The reproduced original digital information data DOD are sent from the deciphering portion 30.

The deciphering circuit shown in FIG. 9 is constituted with a deciphering portion 30 to which the enciphered digital information data DXD in the form of j-bit word sequence data obtained from the enciphering circuit shown in FIG. 8 are supplied as input data, a key data generator 31 operative to send key data DEY, a random number generator 32 and an initial value data generator 33 operative to supply the random number generator 32 with initial value data DIT. The key data DEY obtained from the key data generator 31 are supplied to the random number generator 32.

The random number generator 32 is constituted with a register 25, a cipher producing portion 26, a bit extracting portion 27 and a bit number converting portion 28, in almost the same manner as the random number generator 22 shown in FIG. 8, to supply the deciphering portion 30 with pseudo-random number data DXA. However, the enciphered digital information data DXD which are supplied to the deciphering portion 30 are supplied to the bit number converting portion 28 and output data (DFD) obtained from the bit number converting portion 28 are supplied to the register 25 as input data from the outside. The key data generator 31 and the initial value data generator 33 correspond to the key data generator 21 and the initial value data generator 23 shown in FIG. 8, respectively.

Incidentally, the random number generator 32 may produce genuine random number data in place of the pseudo-random number data DXA. In such a case, the genuine random number data are sent from the random number generator 32 to be supplied to the deciphering portion 30.

In the deciphering portion 30, the enciphered digital information data DXD are subjected to deciphering process in response to the pseudo-random number data DXA or the genuine random number data obtained from the random number generator 32 to reproduce the original digital information data DOD. The reproduced digital information data DOD thus obtained on the basis of the enciphered digital information data DXD are sent from the deciphering portion 30.

The deciphering circuit shown in FIG. 11 is constituted to include a deciphering portion 30, to which the enciphered digital information data DXD in the form of i-bit word sequence data obtained from the enciphering circuit shown in FIG. 10 are supplied as input data, in almost the same manner as the deciphering circuit shown in FIG. 9 but any portion corresponding to the bit number converting portion 28 shown in FIG. 9 is not provided in a random number generator 32. With such arrangements, enciphered digital information data DXD supplied to the deciphering portion 30 are not supplied to the random number generator 32 and cipher data DEZ obtained from a cipher producing portion 26 are supplied to a bit extracting portion 27 and further fed back to a register 25 as input data in the deciphering circuit shown in FIG. 11. The overall operation of the deciphering circuit shown in FIG. 11 is almost the same as that of the deciphering circuit shown in FIG. 9.

Supposing that difficulty in deciphering enciphered digital information data which are obtained by subjecting digital information data to enciphering process is referred to cipher strength, the larger the cipher strength is, the more it is desirable in cipher-transmission of the digital information data for the purpose of enciphering.

In the case where the enciphering circuit shown in FIG. 6 is used, when a condition in which the contents of the digital information data DOD as the input data remain unchanged continues, the contents of the enciphered digital information data DXD also remain unchanged. On the other hand, in the case where the enciphering circuit shown in FIG. 8 or 10 is used, when a condition in which the contents of the digital information data DOD as the input data remain unchanged continues, the contents of the enciphered digital information data DXD are prevented from remaining unchanged because the feedback data DFD or the cipher data DEZ are fed back to the register 25 in the random number generator 22.

This means that the cipher strength of the enciphering circuit shown in FIG. 8 or 10 is larger than that of the cipher strength of the enciphering circuit shown in FIG. 6. Accordingly, it is desirable to use the enciphering circuit shown in FIG. 8 or 10 for subjecting the HD signal to the enciphering process in the cipher-transmission of the HD-SDI signal.

When the enciphering circuit shown in FIG. 8 or 10 is used for subjecting the HD signal to the enciphering process to produce the enciphered HD signal, the deciphering circuit shown in FIG. 9 or 11 is used for subjecting the enciphered HD signal to the deciphering process to reproduce the original HD signal. In such a case, since it is necessary for the enciphering circuit shown in FIG. 8 or 10 and the deciphering circuit shown in FIG. 9 or 11 to generate the same pseudo-random number data DXA or genuine random number data at the same time, respectively, the initial value data DIT which are supplied from the initial value data generator 23 to the register 25 in the random number generator 22 of the enciphering circuit shown in FIG. 8 or 10 and the initial value data DIT which are supplied from the initial value data generator 33 to the register 25 in the random number generator 32 of the deciphering circuit shown in FIG. 9 or 11 are fixed to represent the same value.

Then, when the enciphering circuit shown in FIG. 8 or 10 is used for subjecting the HD signal to the enciphering process, the operation of the random number generator 22 is reset at each line period of the HD signal which is to be enciphered in consideration of the possibility of erroneous transmission of the serial data obtained by subjecting the enciphered HD signal to the P/S conversion. Consequently, in the case where the enciphering circuit shown in FIG. 8 is used, the same pseudo-random number data DXA or genuine random number data are obtained from the random number generator 22 at each line period of the HD signal which is to be enciphered when the HD signal represents, for example, unicolored images, and in the case where the enciphering circuit shown in FIG. 10 is used, the same pseudo-random number data DXA or genuine random number data are obtained from the random number generator 22 at each line period of the HD signal which is to be enciphered regardless of images represented by the HD signal.

When the same pseudo-random number data DXA or genuine random number data are obtained from the random number generator 22 at each line period of the HD signal which is to be enciphered as mentioned above, it comes to be easy to assume the contents of the original HD signal on the strength of the enciphered HD signal and therefore reduction in the cipher strength is brought about.

Further, in the case where the enciphering circuit shown in FIG. 8 is used, the same pseudo-random number data DXA or genuine random number data are obtained from the random number generator 22 at each frame period of the HD signal which is to be enciphered when a plurality of successive frame periods of the HD signal represent, for example, the same still images, and in the case where the enciphering circuit shown in FIG. 10 is used, the same pseudo-random number data DXA or genuine random number data are obtained from the random number generator 22 at each frame period of the HD signal which is to be enciphered regardless of images represented by the HD signal.

When the same pseudo-random number data DXA or genuine random number data are obtained from the random number generator 22 at each frame period of the HD signal which is to be enciphered as mentioned above, it comes to be easy to assume the contents of the original HD signal on the strength of the enciphered HD signal and therefore reduction in the cipher strength is brought about also.

Accordingly, it is an object of the present invention to provide an apparatus for enciphering data in which digital information data having a series of data partitions, such as an HD signal which is obtained by subjecting an HD-SDI signal to S/P conversion, are subjected to enciphering process in response to key data or enciphering process in response to random number data or pseudo-random number data produced on the basis of the key data, for producing enciphered digital information data, and by which the cipher strength of the enciphered digital information data can be surely improved.

Another object of the present invention is to provide an apparatus for deciphering data by which enciphered digital information data which are obtained by subjecting digital information data to such enciphering process as to produce enciphered data having the improved cipher strength can be subjected to deciphering process for reproducing the original digital information data having a series of data partitions, such as an HD signal which is obtained by subjecting an HD-SDI signal to S/P conversion.

DISCLOSURE OF THE INVENTION

According to the invention claimed in any one of claims 1 to 3 of the present application, there is provided an apparatus for enciphering data, which comprises a cipher producing portion for subjecting input data to enciphering process in accordance with rules determined by key data to produce cipher data, an enciphering portion for subjecting digital information data to enciphering process responding to random number data or pseudo-random number data produced on the basis of the cipher data obtained from the cipher producing portion to produce enciphered digital information data, a data supplying portion for producing the input data for the cipher producing portion with initial value data supplied thereto and supplying the cipher producing portion with the produced input data, and an initial value data supplying portion for supplying information data which vary at each data partition of the digital information data supplied to the enciphering portion to the data supplying portion as initial value data.

According to the invention claimed in claim 4 or 5 of the present application, there is provided an apparatus for enciphering data, which comprises a data inserting portion for inserting information data which vary at each data partition of digital information data into the digital information data to produce modified digital information data, a cipher producing portion for subjecting input data to enciphering process in accordance with rules determined by key data to produce cipher data, an enciphering portion for subjecting the modified digital information data obtained from the data inserting portion to enciphering process responding to random number data or pseudo-random number data produced on the basis of the cipher data obtained from the cipher producing portion to produce enciphered digital information data, a data supplying portion for producing the input data for the cipher producing portion with initial value data supplied thereto and supplying the cipher producing portion with the produced input data, and an initial value data supplying portion for extracting the information data which vary at each data partition of the digital information data supplied to the data inserting portion from the modified digital information data obtained from the data inserting portion and supplying the extracted information data to the data supplying portion as initial value data.

According to the invention claimed in claim 6 or 7 of the present application, there is provided an apparatus for enciphering data, which comprises a data inserting portion for inserting information data which vary at each first data partition of digital information data into the digital information data to produce modified digital information data, a cipher producing portion for subjecting input data to enciphering process in accordance with rules determined by key data to produce cipher data, an enciphering portion for subjecting the modified digital information data obtained from the data inserting portion to enciphering process responding to random number data or pseudo-random number data produced on the basis of the cipher data obtained from the cipher producing portion to produce enciphered digital information data, a data supplying portion for producing the input data for the cipher producing portion with initial value data supplied thereto and supplying the cipher producing portion with the produced input data, a first initial value data supplying portion for extracting the information data which vary at each first data partition of the digital information data supplied to the data inserting portion from the modified digital information data obtained from the data inserting portion and supplying the extracted information data to the data supplying portion as initial value data, and a second initial value data supplying portion for extracting information data which vary at each second data partition of the digital information data supplied to the data inserting portion from the modified digital information data obtained from the data inserting portion and supplying the extracted information data to the data supplying portion as initial value data.

According to the invention claimed in any one of claims 8 to 10 of the present application, there is provided an apparatus for enciphering data, which comprises a key data generating portion for sending key data, an enciphering portion for subjecting digital information data to enciphering process responding to modified key data based on the key data sent from the key data generating portion to produce enciphered digital information data, an information data generating portion for sending information data which vary at each data partition of the digital information data supplied to the enciphering portion, and an operation processing portion for subjecting the key data sent from the key data generating portion and the information data sent from the information data generating portion to operation process to produce the modified key data to be supplied to the enciphering portion.

According to the invention claimed in any one of claims 11 to 13 of the present application, there is provided an apparatus for enciphering data, which comprises an information data generating portion for sending information data which vary at each data partition of digital information data, an operation processing portion for subjecting the digital information data and the information data sent from the information data generating portion to operation process to produce the modified digital information data, a key data generating portion for sending key data, and an enciphering portion for subjecting the modified digital information data obtained from the operation processing portion to enciphering process responding to the key data sent from the key data generating portion to produce enciphered digital information data.

According to the invention claimed in claim 14 or 15 of the present application, there is provided an apparatus for enciphering data, which comprises a data inserting portion for inserting information data which vary at each data partition of digital information data into the digital information data to produce modified digital information data, an information data generating portion for extracting the information data which vary at each data partition of the digital information data supplied to the data inserting portion from the modified digital information data obtained from the data inserting portion and sending the extracted information data, a key data generating portion for sending key data, an operation processing portion for subjecting the key data sent from the key data generating portion and the information data sent from the information data generating portion to operation process to produce modified key data and sending the modified key data, and an enciphering portion for subjecting the modified digital information data obtained from the data inserting portion to enciphering process responding to the modified key data sent from the operation processing portion to produce enciphered digital information data.

According to the invention claimed in claim 16 or 17 of the present application, there is provided an apparatus for enciphering data, which comprises a data inserting portion for inserting information data which vary at each data partition of digital information data into the digital information data to produce first modified digital information data, an information data generating portion for extracting the information data which vary at each data partition of the digital information data supplied to the data inserting portion from the first modified digital information data obtained from the data inserting portion and sending the extracted information data, an operation processing portion for subjecting the first modified digital information data obtained from the data inserting portion and the information data sent from the information data generating portion to operation process to produce second modified digital information data, a key data generating portion for sending key data, and an enciphering portion for subjecting the second modified digital information data obtained from the operation processing portion to enciphering process responding to the key data sent from the key data generating portion to produce enciphered digital information data.

According to the invention claimed in claim 18 or 19 of the present application, there is provided an apparatus for enciphering data, which comprises a data inserting portion for inserting information data which vary at each first data partition of digital information data into the digital information data to produce modified digital information data, a first information data generating portion for extracting the information data which vary at each first data partition of the digital information data supplied to the data inserting portion from the modified digital information data obtained from the data inserting portion and sending the extracted information data, a second information data generating portion for extracting information data which vary at each second data partition of the digital information data supplied to the data inserting portion from the modified digital information data obtained from the data inserting portion and sending the extracted information data, a key data generating portion for sending key data, an operation processing portion for subjecting the key data sent from the key data generating portion and the information data sent from each of the first and second information data generating portions to operation process to produce modified key data and sending the modified key data, and an enciphering portion for subjecting the modified digital information data obtained from the data inserting portion to enciphering process responding to the modified key data sent from the operation processing portion to produce enciphered digital information data.

According to the invention claimed in claim 20 or 21 of the present application, there is provided an apparatus for enciphering data, which comprises a data inserting portion for inserting information data which vary at each first data partition of digital information data into the digital information data to produce first modified digital information data, a first information data generating portion for extracting the information data which vary at each first data partition of the digital information data supplied to the data inserting portion from the first modified digital information data obtained from the data inserting portion and sending the extracted information data, a second information data generating portion for extracting information data which vary at each second data partition of the digital information data supplied to the data inserting portion from the modified digital information data obtained from the data inserting portion and sending the extracted information data, an operation processing portion for subjecting the first modified digital information data obtained from the data inserting portion and the information data sent from each of the first and second information data generating portions to operation process to produce second modified digital information data and sending the second modified digital information data, a key data generating portion for sending key data, and an enciphering portion for subjecting the second modified digital information data obtained from the operation processing portion to enciphering process responding to the key data sent from the key data generating portion to produce enciphered digital information data.

According to the invention claimed in any one of claims 22 to 24 of the present application, there is provided an apparatus for deciphering data, which comprises a cipher producing portion for subjecting input data to enciphering process in accordance with rules determined by key data to produce cipher data, a deciphering portion for subjecting enciphered digital information data to deciphering process responding to random number data or pseudo-random number data produced on the basis of the cipher data obtained from the cipher producing portion to reproduce original digital information data, a data supplying portion for producing the input data for the cipher producing portion with initial value data supplied thereto and supplying the cipher producing portion with the produced input data, and an initial value data supplying portion for supplying information data which vary at each data partition of the enciphered digital information data to the data supplying portion as initial value data.

According to the invention claimed in claim 25 or 26 of the present application, there is provided an apparatus for deciphering data, which comprises a cipher producing portion for subjecting input data to enciphering process in accordance with rules determined by key data to produce cipher data, a deciphering portion for subjecting enciphered digital information data to enciphering process responding to random number data or pseudo-random number data produced on the basis of the cipher data obtained from the cipher producing portion to reproduce original digital information data, a data supplying portion for producing the input data for the cipher producing portion with initial value data supplied thereto and supplying the cipher producing portion with the produced input data, and an initial value data supplying portion for extracting information data which vary at each data partition of the enciphered digital information data supplied to the deciphering portion and supplying the extracted information data to the data supplying portion as initial value data.

According to the invention claimed in claim 27 or 28 of the present application, there is provided an apparatus for deciphering data, which comprises a cipher producing portion for subjecting input data to enciphering process in accordance with rules determined by key data to produce cipher data, a deciphering portion for subjecting enciphered digital information data to enciphering process responding to random number data or pseudo-random number data produced on the basis of the cipher data obtained from the cipher producing portion to reproduce original digital information data, a data supplying portion for producing the input data for the cipher producing portion with initial value data supplied thereto and supplying the cipher producing portion with the produced input data, a first initial value data supplying portion for extracting information data which vary at each first data partition of the enciphered digital information data supplied to the deciphering portion from the enciphered digital information data and supplying the extracted information data to the data supplying portion as initial value data, and a second initial value data supplying portion for extracting information data which vary at each second data partition of the enciphered digital information data supplied to the deciphering portion from the enciphered digital information data and supplying the extracted information data to the data supplying portion as initial value data.

According to the invention claimed in any one of claims 29 to 31 of the present application, there is provided an apparatus for deciphering data, which comprises a key data generating portion for sending key data, a deciphering portion for subjecting enciphered digital information data to deciphering process responding to modified key data based on the key data sent from the key data generating portion to reproduce original digital information data, an information data generating portion for sending information data which vary at each data partition of the enciphered digital information data supplied to the deciphering portion, and an operation processing portion for subjecting the key data sent from the key data generating portion and the information data sent from the information data generating portion to operation process to produce the modified key data to be supplied to the deciphering portion.

According to the invention claimed in any one of claims 32 to 34 of the present application, there is provided an apparatus for deciphering data, which comprises an information data generating portion for sending information data which vary at each data partition of enciphered digital information data, an operation processing portion for subjecting the enciphered digital information data and the information data sent from the information data generating portion to operation process to produce the modified enciphered digital information data, a key data generating portion for sending key data, and a deciphering portion for subjecting the modified enciphered digital information data obtained from the operation processing portion to deciphering process responding to the key data sent from the key data generating portion to reproduce original digital information data.

According to the invention claimed in claim 35 or 36 of the present application, there is provided an apparatus for deciphering data, which comprises an information data generating portion for extracting information data which vary at each data partition of enciphered digital information data and sending the extracted information data, a key data generating portion for sending key data, an operation processing portion for subjecting the key data sent from the key data generating portion and the information data sent from the information data generating portion to operation process to produce modified key data and sending the modified key data, and a deciphering portion for subjecting the enciphered digital information data supplied to the information data generating portion to deciphering process responding to the modified key data sent from the operation processing portion to reproduce original digital information data.

According to the invention claimed in claim 37 or 38 of the present application, there is provided an apparatus for deciphering data, which comprises an information data generating portion for extracting information data which vary at each data partition of enciphered digital information data and sending the extracted information data, an operation processing portion for subjecting the enciphered digital information data obtained and the information data sent from the information data generating portion to operation process to produce modified enciphered digital information data, a key data generating portion for sending key data, and a deciphering portion for subjecting the modified enciphered digital information data obtained from the operation processing portion to deciphering process responding to the key data sent from the key data generating portion to produce original digital information data.

According to the invention claimed in claim 39 or 40 of the present application, there is provided an apparatus for deciphering data, which comprises a first information data generating portion for extracting information data which vary at each first data partition of enciphered digital information data and sending the extracted information data, a second information data generating portion for extracting information data which vary at each second data partition of the enciphered digital information data supplied to the first information data generating portion and sending the extracted information data, a key data generating portion for sending key data, an operation processing portion for subjecting the key data sent from the key data generating portion and the information data sent from each of the first and second information data generating portions to operation process to produce modified key data and sending the modified key data, and a deciphering portion for subjecting the enciphered digital information data supplied to the first and second information data generating portions to deciphering process responding to the modified key data sent from the operation processing portion to reproduce original digital information data.

According to the invention claimed in claim 41 or 42 of the present application, there is provided an apparatus for deciphering data, which comprises a first information data generating portion for extracting information data which vary at each first data partition of enciphered digital information data and sending the extracted information data, a second information data generating portion for extracting information data which vary at each second data partition of the enciphered digital information data supplied to the first information data generating portion from the enciphered digital information data and sending the extracted information data, an operation processing portion for subjecting the enciphered digital information data supplied to the first and second information data generating portions and the information data sent from each of the first and second information data generating portions to operation process to produce modified enciphered digital information data and sending the modified enciphered digital information data, a key data generating portion for sending key data, and a deciphering portion for subjecting the modified enciphered digital information data obtained from the operation processing portion to deciphering process responding to the key data sent from the key data generating portion to reproduce original digital information data.

In the apparatus for enciphering data constituted in accordance with the invention claimed in any one of claims 1 to 7 of the present application, since the initial value data supplying portion is provided for supplying the information data, which vary at each data partition of the digital information data set to be enciphered, to the data supplying portion for supplying the cipher producing portion with the input data, as the initial value data, when the production of the pseudo-random number data or random number data are reset at each data partition of the digital information data set to be enciphered, the pseudo-random number data or random number data are prevented from appearing to be the same at each data partition of the digital information data set to be enciphered.

In the case where the digital information data set to be enciphered are the HD signal, for example, since the initial value data supplying portion is provided for supplying one or both of the line number data and the frame number data, each of which vary at each line or frame period of the HD signal, to the register as initial value data, when the production of the pseudo-random number data or random number data is reset at each line period of the HD signal, the pseudo-random number data or random number data are prevented from appearing to be the same at each line or frame period of the HD signal.

As a result, it comes to be hard to assume the contents of the original digital information data, such as the original HD signal, on the strength of the enciphered digital information data, such as the enciphered HD signal, and therefore the enciphered digital information data are improved in its cipher strength.

In the apparatus for enciphering data constituted in accordance with the invention claimed in any one of claims 8 to 10, 14, 15, 18 and 19 of the present application, since the information data generating portion is provided for sending the information data which vary at each data partition of the digital information data set to be enciphered and the operation processing portion is also provided for subjecting the key data sent from the key data generating portion and the information data sent from the information data generating portion to the operation process to produce the modified key data and supplying the modified key data to the enciphering portion for producing the enciphered digital information data based on the digital information data set to be enciphered, the key data used for the enciphering process through which the enciphered digital information data are obtained based on the digital information data set to be enciphered are modified to vary at each data partition of the digital information data set to be enciphered.

In the case where the digital information data set to be enciphered are the HD signal, for example, since the information data generating portion is provided for sending one or both of the line number data and the frame number data, each of which vary at each line or frame period of the HD signal, and the operation processing portion is also provided for subjecting the key data sent from the key data generating portion and one or both of the line number data and the frame number data sent from the information data generating portion to the operation process to produce the modified key data and supplying the modified key data to the enciphering portion which produces the enciphered HD signal based on the HD signal, the key data used for the enciphering process through which the enciphered HD signal is obtained based on the HD signal set to be enciphered are modified to vary at each line or frame period of the HD signal or at not only each line period but also each frame period of the HD signal.

As a result, it comes to be hard to assume the contents of the original digital information data, such as the original HD signal, on the strength of the enciphered digital information data, such as the enciphered HD signal, and therefore the enciphered digital information data are improved in its cipher strength.

In the apparatus for enciphering data constituted in accordance with the invention claimed in any one of claims 11 to 13, 16, 17, 20 and 21 of the present application, since the information data generating portion is provided for sending the information data which vary at each data partition of the digital information data set to be enciphered and the operation processing portion is also provided for subjecting the digital information data set to be enciphered and the information data sent from the information data generating portion to the operation process to produce the modified digital information data and supplying the modified digital information data to the enciphering portion to which the key data are supplied, the digital information data set to be enciphered are modified to vary at each data partition thereof and then enciphered in response to the key data in the enciphering portion.

In the case where the digital information data set to be enciphered are the HD signal, for example, since the information data generating portion is provided for sending one or both of the line number data and the frame number data, each of which vary at each line or frame period of the HD signal, and the operation processing portion is also provided for subjecting the HD signal and one or both of the line number data and the frame number data sent from the information data generating portion to the operation process to produce the modified HD signal and supplying the modified HD signal to the enciphering portion to which the key data are supplied, the HD signal are modified to vary at each line or frame period thereof or at not only each line period but also each frame period thereof and then enciphered in response to the key data in the enciphering portion.

As a result, it comes to be hard to assume the contents of the original digital information data, such as the original HD signal, on the strength of the enciphered digital information data, such as the enciphered HD signal, and therefore the enciphered digital information data are improved in its cipher strength.

In the apparatus for deciphering data constituted in accordance with the invention claimed in any one of claims 22 to 28 of the present application, since the initial value data supplying portion is provided for supplying the information data which vary at each data partition of the enciphered digital information data to the data supplying portion operative to supply the cipher producing portion with the input data, the deciphering process to which the enciphered digital information data, which are obtained by subjecting the digital information data to the enciphered process for improving the cipher strength, are subjected is appropriately carried out in response to the pseudo-random number date or the random number date to reproduce the original digital information data.

In the case where the enciphered digital information data are the enciphered HD signal, for example, since the initial value data supplying portion is provided for supplying one or both of the line number data and the frame number data, each of which vary at each line or frame period of the enciphered HD signal, to the data supplying portion operative to supply the cipher producing portion with the input data, the deciphering process to which the enciphered HD signal, which is obtained by subjecting the HD signal to the enciphered process for improving the cipher strength, is subjected is appropriately carried out in response to the pseudo-random number date or the random number date to reproduce the original HD signal.

In the apparatus for deciphering data constituted in accordance with the invention claimed in any one of claims 29 to 31, 35, 36, 39 and 40 of the present application, since the information data generating portion is provided for sending the information data which vary at each data partition of the enciphered digital information data and the operation processing portion is also provided for subjecting the key data sent from the key data generating portion and the information data sent from the information data generating portion to the operation process to produce the modified key data and supplying the modified key data to the deciphering portion operative to reproduce the original digital information data based on the enciphered digital information data, the deciphering process to which the enciphered digital information data, which are obtained by subjecting the digital information data to the enciphered process for improving the cipher strength, are subjected is appropriately carried out in response to the key data to reproduce the original digital information data.

In the case where the enciphered digital information data are the enciphered HD signal, for example, since the information data generating portion is provided for sending one or both of the line number data and the frame number data, each of which vary at each line or frame period of the enciphered HD signal, and the operation processing portion is also provided for subjecting the key data sent from the key data generating portion and one or both of the line number data and the frame number data sent from the information data generating portion to the operation process to produce the modified key data and supplying the modified key data to the deciphering portion operative to reproduce the original HD signal based on the enciphered HD signal, the deciphering process to which the enciphered HD signal, which is obtained by subjecting the HD signal to the enciphered process for improving the cipher strength, is subjected is appropriately carried out in response to the key data to reproduce the original HD signal.

In the apparatus for deciphering data constituted in accordance with the invention claimed in any one of claims 32 to 34, 37, 38, 41 and 42 of the present application, since the information data generating portion is provided for sending the information data which vary at each data partition of the enciphered digital information data and the operation processing portion is also provided for subjecting the enciphered digital information data and the information data sent from the information data generating portion to the operation process to produce the modified enciphered digital information data and supplying the modified enciphered digital information data to the deciphering portion to which the key data are supplied, the deciphering process to which the enciphered digital information data, which are obtained by subjecting the digital information data to the enciphered process for improving the cipher strength, are subjected is appropriately carried out in response to the key data to reproduce the original digital information data.

In the case where the enciphered digital information data are the enciphered HD signal, for example, since the information data generating portion is provided for sending one or both of the line number data and the frame number data, each of which vary at each line or frame period of the enciphered HD signal, and the operation processing portion is also provided for subjecting the enciphered HD signal and one or both of the line number data and the frame number data sent from the information data generating portion to the operation process to produce the modified enciphered HD signal and supplying the modified enciphered HD signal to the deciphering portion to which the key data are supplied, the deciphering process to which the enciphered HD signal, which is obtained by subjecting the HD signal to the enciphered process for improving the cipher strength, is subjected is appropriately carried out in response to the key data to reproduce the original HD signal.

BRIEF DESCRIPTION OF THE DRAWINGS

FIGS. 2A and 2B are illustrations used for explaining an example of data format of an HD signal;

FIG. 5 is an illustration showing an example of data format of an HD signal;

FIG. 11 is a schematic block diagram showing a third embodiment of deciphering circuit which can be used for deciphering the enciphered HD signal;

FIG. 12 is a schematic block diagram showing an embodiment of apparatus for enciphering data according to the invention claimed in any one of claims 1 to 3;

FIG. 19 is a schematic block diagram showing an embodiment of apparatus for enciphering data according to the invention claimed in any one of claims 8 to 10;

FIG. 20 is a schematic block diagram showing an embodiment of apparatus for deciphering data according to the invention claimed in any one of claims 29 to 31;

FIG. 21 is a schematic block diagram showing an embodiment of apparatus for enciphering data according to the invention claimed in any one of claims 11 to 13;

FIG. 24 is a schematic block diagram showing an embodiment of apparatus for deciphering data according to the invention claimed in claim 35 or 36;

FIG. 25 is a schematic block diagram showing an embodiment of apparatus for enciphering data according to the invention claimed in claim 16 or 17;

FIG. 29 is a schematic block diagram showing an embodiment of apparatus for enciphering data according to the invention claimed in claim 20 or 21; and FIG. 30 is a schematic block diagram showing an embodiment of apparatus for deciphering data according to the invention claimed in claim 41 or 42.

EMBODIMENTS MOST PREFERABLE FOR WORKING OF THE INVENTION

Figure 1:
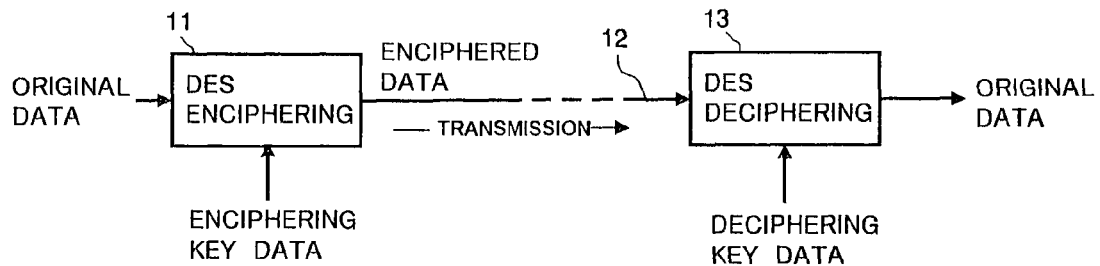
FIG. 1 is a schematic block diagram showing a basic structure of a cipher-transmission system according to the DES.
Figure 4:
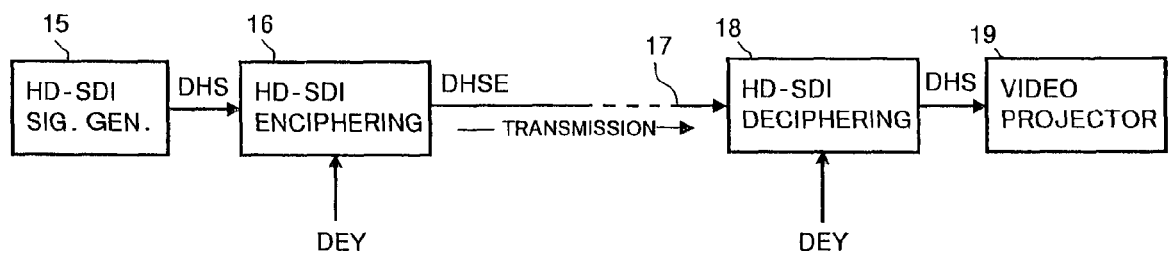
FIG. 4 is a schematic block diagram showing a cipher-transmission system which can be used for the cipher-transmission of an HD-SDI signal.
Figure 6:
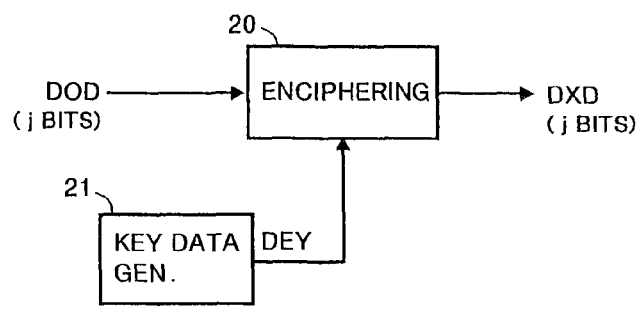
FIG. 6 is a schematic block diagram showing a first embodiment of enciphering circuit which can be used for enciphering an HD signal.
Figure 3:
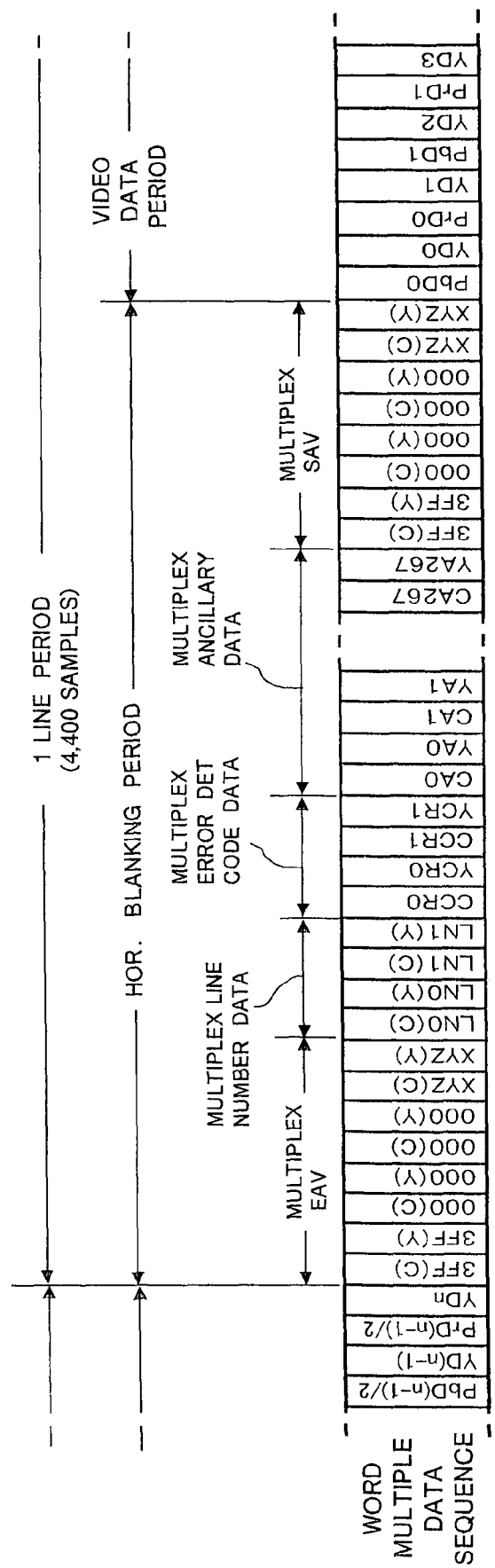
FIG. 3 is an illustration used for explaining another example of data format of an HD signal.
Figure 7:
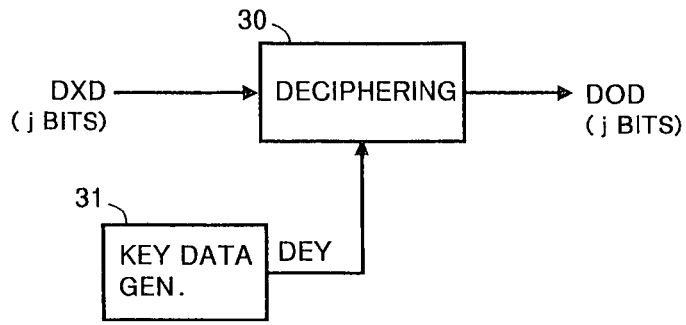
FIG. 7 is a schematic block diagram showing a first embodiment of deciphering circuit which can be used for deciphering an enciphered HD signal.
Figure 8:
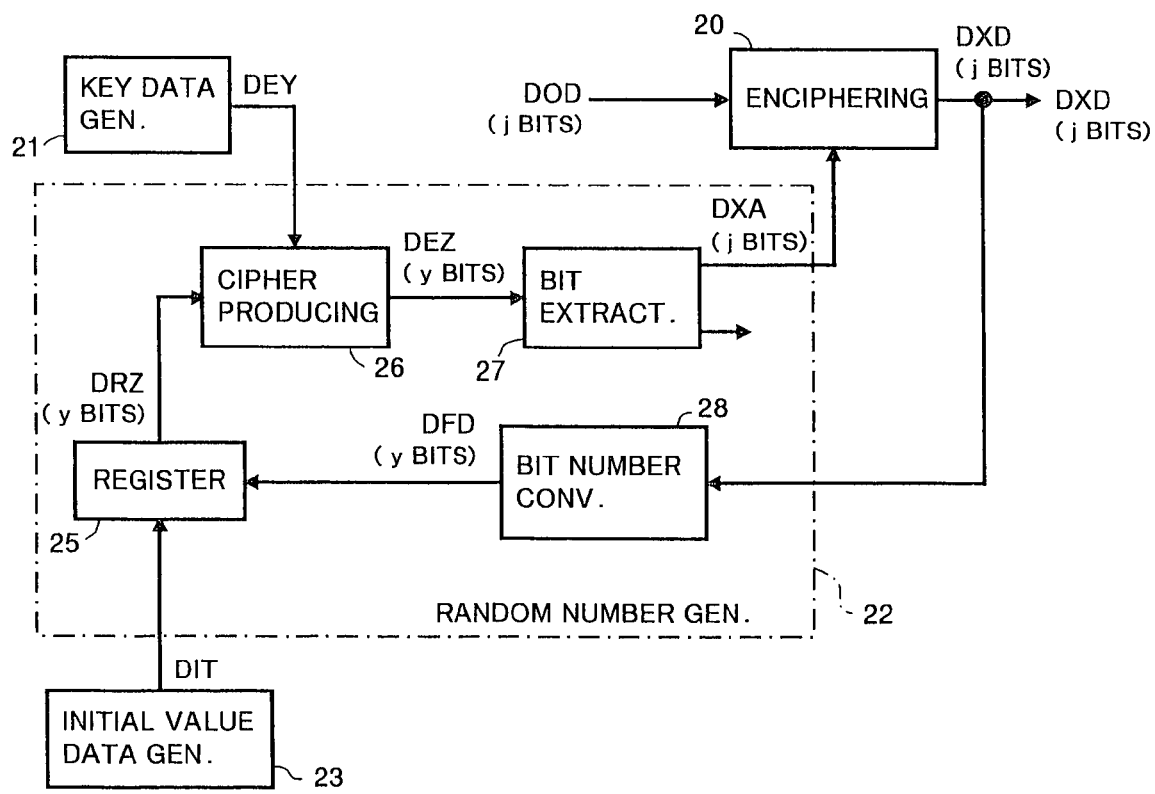
FIG. 8 is a schematic block diagram showing a second embodiment of enciphering circuit which can be used for enciphering the HD signal.
Figure 9:
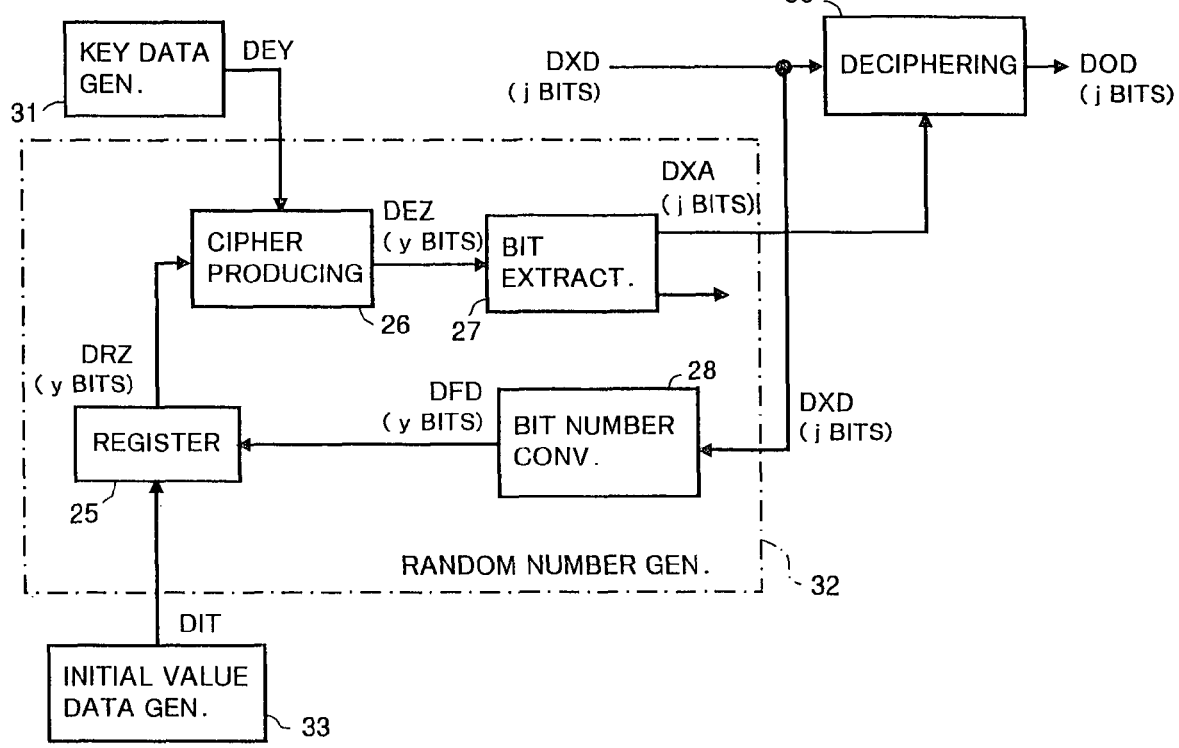
FIG. 9 is a schematic block diagram showing a second embodiment of deciphering circuit which can be used for deciphering the enciphered HD signal.
Figure 10:
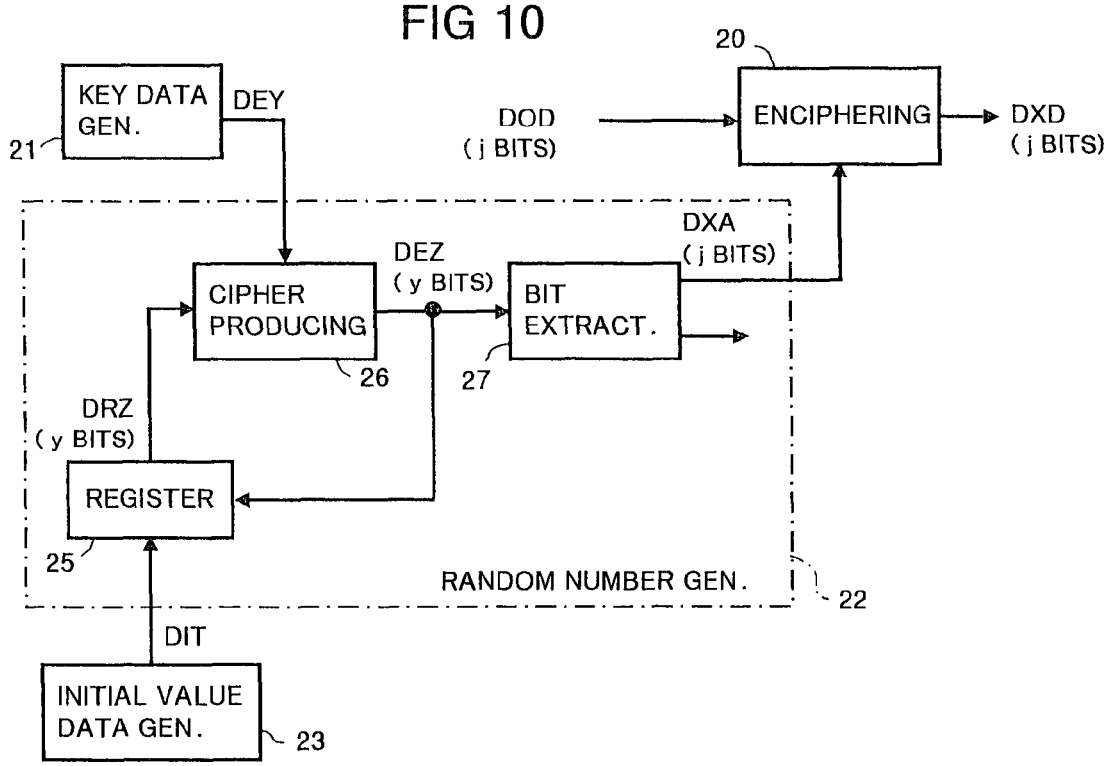
FIG. 10 is a schematic block diagram showing a third embodiment of enciphering circuit which can be used for enciphering the HD signal.

FIG. 12 shows an embodiment of apparatus for enciphering data according to the invention claimed in any one of claims 1 to 3.

The embodiment shown in FIG. 12 is constituted with an enciphering portion 40 to which an HD signal DOD as shown in FIG. 5 is supplied as digital information data in the form of j-bit word sequence data, a random number generator 41, a key data generator 42 operative to supply the random number generator 41 with key data DEY and a line number data extracting portion 43 to which the HD signal DOD is supplied as well as the enciphering portion 40.

The line number data extracting portion 43 is operative to extract, from the HD signal, line number data DLN which represent a line number varying line by line in the HD signal and supply the random number generator 41 with the extracted line number data DLN.

In the random number generator 41, a register 44 is provided to constitute a data supplying portion for producing register output data DRZ composed of y-bit words in response to input data and supplying a cipher producing portion 45 with the register output data DRZ. The line number data DLN obtained from the line number data extracting portion 43 are supplied to the register 44 as initial value data and the operation of the register 44 is reset in response to the line number data DLN at each line period of the HD signal DOD supplied to the enciphering portion 40. The line number data extracting portion 43 constitutes an initial value data generator for sending the line number data DLN to be supplied to the register 44 in the random number generator 41 as the initial value data.

The key data DEY obtained from the key data generator 42 are supplied to the cipher producing portion 45 in the random number generator 41. The cipher producing portion 45 is operative to subject the register output data DRZ, which are supplied to the cipher producing portion 45 as input data, to enciphering process in accordance with rules determined by the key data DEY to produce cipher data DEZ composed of y-bit words. The cipher data DEZ thus obtained from the cipher producing portion 45 are supplied to a bit extracting portion 46.

The bit extracting portion 46 is operative to extract j bits of each of the y-bit words constituting the cipher data DEZ to produce pseudo-random number data DZA composed of j-bit words. The pseudo-random number data DZA obtained from the bit extracting portion 46 are sent from the random number generator 41 to be supplied to the enciphering portion 40.

Incidentally, the random number generator 41 may produce random number data (genuine random number data) in place of the pseudo-random number data DZA. In such a case, the random number data are sent from the random number generator 41 to be supplied to the enciphering portion 40.

The enciphering portion 40 is operative to subject the HD signal DOD to enciphering process responding to the pseudo-random number data DZA or the random number data obtained from the random number generator 41 to produce enciphered HD signal DXD in the form of j-bit word sequence data based on the HD signal DOD.

When the enciphered HD signal DXD is produced by subjecting the HD signal DOD to the enciphering process, video data DVV which are provided in a portion corresponding to a video data period and time reference code data EAV which are provided in a starting end of a portion corresponding to a horizontal blanking period successive to the portion corresponding to the video data period in a portion corresponding to each line period of the HD signal, as shown in FIG. 5, are subjected to the enciphering process to produce an enciphered video data. On the other hand, various data provided in the portion corresponding to the horizontal blanking period except the time reference code data EAV, that is, line number data DLN, error detecting code data CRCC, ancillary data DAA including audio data, and time reference code data SAV, are not subjected to the enciphering process but combined with the enciphered video data. As a result, the enciphered HD signal DXD which contains the various data provided in the portion corresponding to the horizontal blanking period except the time reference code data EAV and the enciphered video data successive to the various data is obtained.

The enciphered HD signal DXD sent from the enciphering portion 40 is supplied to a bit number converting portion 47 in the random number generator 41. In the bit number converting portion 47, the enciphered HD signal DXD is converted to feedback data DFD in the form of y-bit word sequence data. The feedback data DFD obtained from the bit number converting portion 47 are fed back to the register 44 as the input data.

The register 44 is operative first to send the register output data DRZ obtained in response to the line number data DLN obtained from the line number data extracting portion 43 and then to send the register output data DRZ obtained in response to the feedback data DFD obtained from the bit number converting portion 47 at each interval between a couple of successive time points of reset on its operation.

Figure 13:
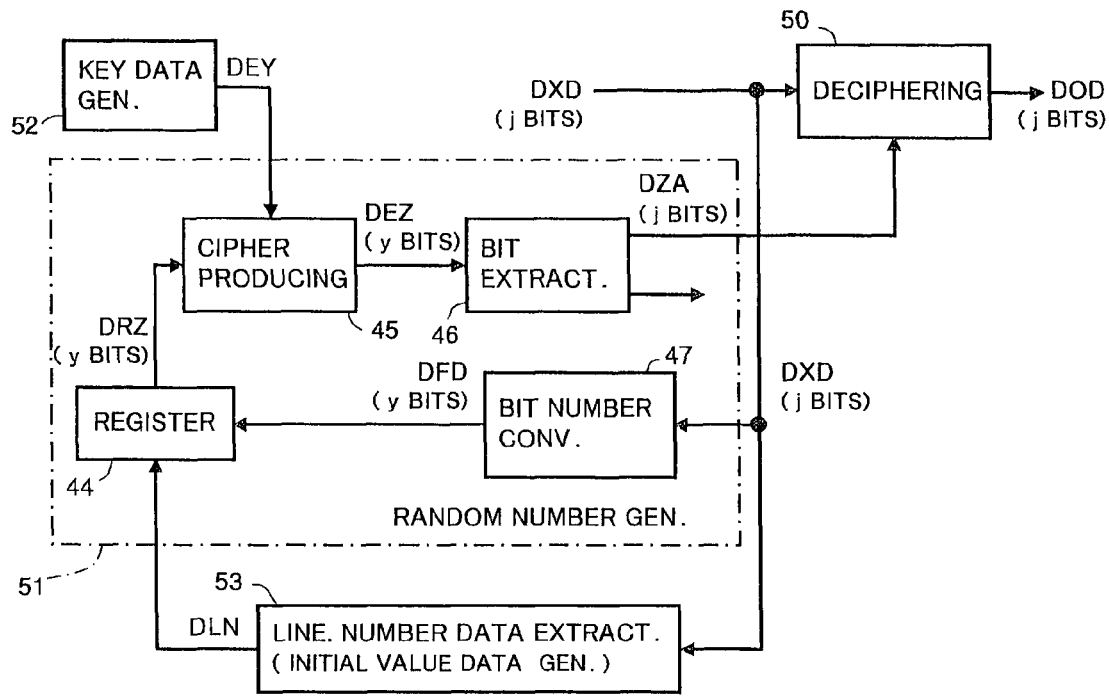
FIG. 13 is a schematic block diagram showing an embodiment of apparatus for deciphering data according to the invention claimed in any one of claims 22 to 24.

FIG. 13 shows an embodiment of apparatus for deciphering data according to the invention claimed in any one of claims 22 to 24. This embodiment is used for subjecting the enciphered HD signal DXD obtained from the apparatus for enciphering data shown in FIG. 12 to deciphering process to reproduce the HD signal DOD as original digital information data.

The embodiment shown in FIG. 13 is constituted with a deciphering portion 50 to which the enciphered HD signal DXD in the form of j-bit word sequence data produced in the enciphering portion 40 shown in FIG. 12, is supplied as input data, a random number generator 51, a key data generator 52 operative to supply the random number generator 51 with key data DEY and a line number data extracting portion 53 to which the enciphered HD signal DXD is supplied as well as the deciphering portion 50.

The line number data extracting portion 53 is operative to extract, from the enciphered HD signal, line number data DLN which represent a line number varying line by line in the enciphered HD signal DXD and supply the random number generator 51 with the extracted line number data DLN.

The random number generator 51 is constituted with a cipher producing portion 45, a register 44 for supplying the cipher producing portion 45 with input data, a bit extracting portion 46 and a bit number converting portion 47 in the similar manner as the random number generator 41 shown in FIG. 12, in order to supply the deciphering portion 50 with pseudo-random number data DZA composed of j-bit words. The enciphered HD signal DXD is supplied to the bit number converting portion 47 as well as the deciphering portion 50 and output data (DFD) obtained from the bit number converting portion 47 are supplied to the register 44 as input data from the outside. The key data generator 52 is provided in the same manner as the key data generator 42 shown in FIG. 12.

Accordingly, in the random number generator 51 of the embodiment shown in FIG. 13 also, the line number data DLN obtained from the line number data extracting portion 53 are supplied to the register 44 as initial value data and the operation of the register 44 is reset in response to the line number data DLN at each line period of the enciphered HD signal DXD supplied to the deciphering portion 50. The line number data extracting portion 53 constitutes an initial value data generator for sending the line number data DLN to be supplied to the register 44 in the random number generator 51 as the initial value data. Then, the register 44 is operative first to send the register output data DRZ obtained in response to the line number data DLN obtained from the line number data extracting portion 53 and then to send the register output data DRZ obtained in response to the output data DFD obtained from the bit number converting portion 47 at each interval between a couple of successive time points of reset on its operation.

Incidentally, the random number generator 51 may produce random number data (genuine random number data) in place of the pseudo-random number data DZA. In such a case, the random number data are sent from the random number generator 51 to be supplied to the deciphering portion 50.

Under such a situation as mentioned above, the deciphering portion 50 is operative to subject the enciphered HD signal DXD to deciphering process responding to the pseudo-random number data DZA or the random number data obtained from the random number generator 51 to reproduce the original HD signal DOD in the form of j-bit word sequence data based on the enciphered HD signal DXD.

When the original HD signal DOD is reproduced by subjecting the enciphered HD signal DXD to the enciphering process, enciphered video data in a portion corresponding to each line period of the enciphered HD signal DXD are subjected to the deciphering process to produce video data DVV which are provided in a portion corresponding to a video data period and time reference code data EAV which are provided in a starting end of a portion corresponding to a horizontal blanking period successive to the portion corresponding to the video data period in a portion corresponding to each line period of the original HD signal DOD. The reproduced video data DVV and time reference code data EAV are combined with various data provided in the portion corresponding to the horizontal blanking period in the portion corresponding to each line period of the original HD signal DOD except the time reference code data EAV, that is, line number data DLN, error detecting code data CRCC, ancillary data DAA including audio data, which have not been subjected to the enciphering process. As a result, the original HD signal DOD which contains the various data provided in the portion corresponding to the horizontal blanking period except the time reference code data EAV and the video data successive to the various data is reproduced.

Figure 14:
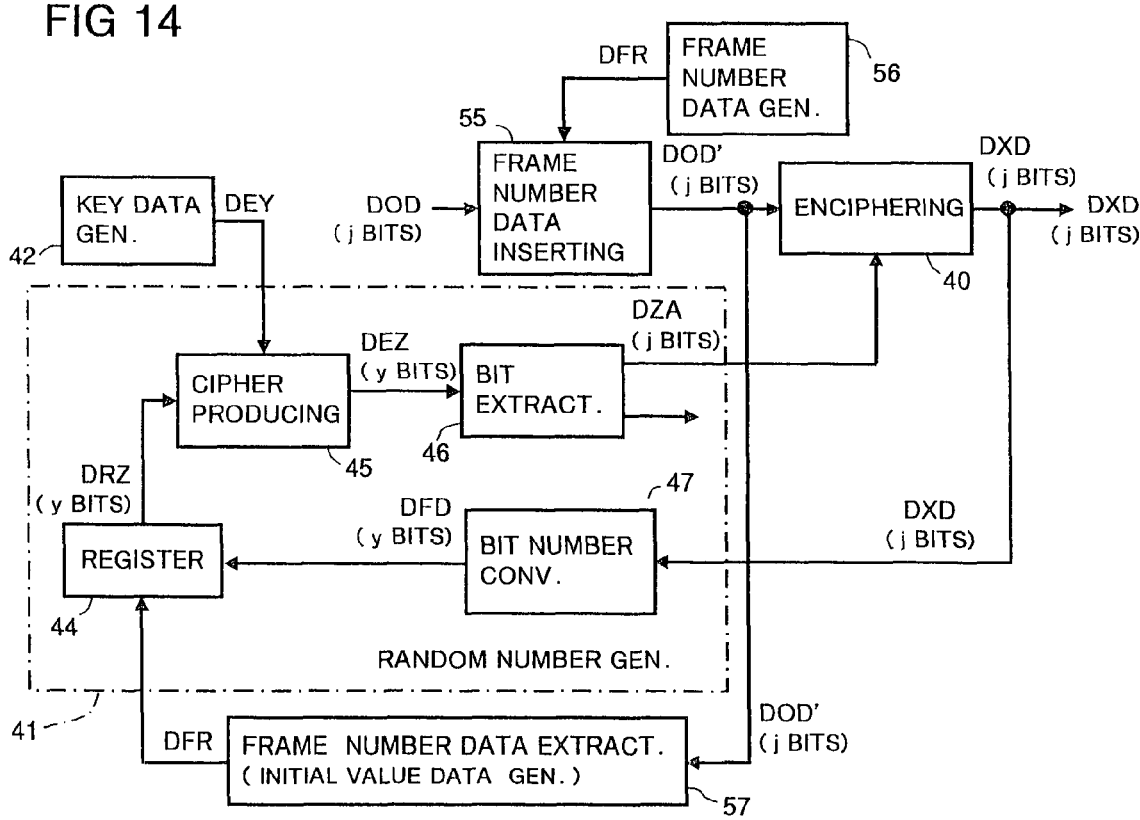
FIG. 14 is a schematic block diagram showing an embodiment of apparatus for enciphering data according to the invention claimed in claim 4 or 5.

FIG. 14 shows an embodiment of apparatus for enciphering data according to the invention claimed in claim 4 or 5.

Figure 15:
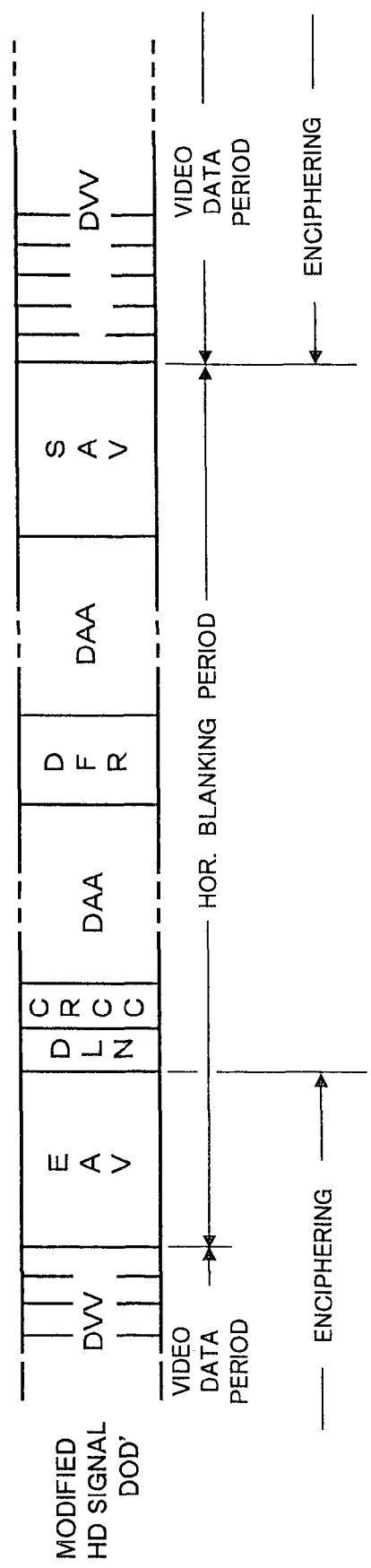
FIG. 15 is an illustration showing an example of data format of a modified HD signal.

In the embodiment shown in FIG. 14, a frame number data inserting portion 55 to which an HD signal DOD as shown in FIG. 5 is supplied as digital information data in the form of j-bit word sequence data, and a frame number data generator 56 for supplying the frame number data inserting portion 55 with frame number data DFR which represent a frame number varying frame by frame in the HD signal DOD, are provided. The frame number data inserting portion 55 is operative to insert the frame number data DFR from the frame number data generator 56 into a part containing ancillary data DAA in a portion corresponding to each horizontal blanking period of the HD signal DOD to produce a modified HD signal DOD' having the portion corresponding to each horizontal blanking period which contains the frame number data DFR in addition to the ancillary data DAA, as shown in FIG. 15.

Further, the embodiment shown in FIG. 14 is constituted with, in addition to the frame number data inserting portion 55 and the frame number data generator 56, an enciphering portion 40 to which the modified HD signal DOD' obtained from the modified HD signal DOD' is supplied as input data, a random number generator 41, a key data generator 42 operative to supply the random number generator 41 with key data DEY and a frame number data extracting portion 57 to which the modified HD signal DOD' is supplied as well as the enciphering portion 40.

The frame number data extracting portion 57 is operative to extract, from the modified HD signal DOD', the frame number data DFR which represent the frame number varying frame by frame in the modified HD signal DOD' and supply the random number generator 41 with the extracted frame number data DFR.

The random number generator 41 is constituted with a register 44, a cipher producing portion 45, a bit extracting portion 46 and a bit number converting portion 47 in the similar manner as the random number generator 41 shown in FIG. 12 and operative to supply the enciphering portion 40 with pseudo-random number data DZA composed of j-bit words. The frame number data DFR obtained from the frame number data extracting portion 57 are supplied to the register 44 as initial value data. The frame number data extracting portion 57 constitutes an initial value data generator for sending the frame number data DFR to be supplied to the register 44 in the random number generator 41 as the initial value data. The register 44 is so arranged, under the condition where the frame number data DFR obtained from the frame number data extracting portion 57 are supplied thereto, that the operation of the register 44 is reset at each line period of the modified HD signal DOD' supplied to the enciphering portion 40. The key data generator 42 is also provided in the same manner as the key data generator 42 shown in FIG. 12.

Incidentally, the random number generator 41 may produce random number data (genuine random number data) in place of the pseudo-random number data DZA. In such a case, the random number data are sent from the random number generator 41 to be supplied to the enciphering portion 40.

The enciphering portion 40 is operative to subject the modified HD signal DOD' to enciphering process responding to the pseudo-random number data DZA or the random number data obtained from the random number generator 41 to produce enciphered HD signal DXD in the form of j-bit word sequence data based on the modified HD signal DOD'. The enciphering process for the modified HD signal DOD' in the enciphering portion 40 is carried out in the same manner as the enciphering process for the HD signal DOD in the enciphering portion 40 shown in FIG. 12.

The enciphered HD signal DXD obtained from the enciphering portion 40 is supplied to the bit number converting portion 47 in the random number generator 41. In the bit number converting portion 47, the enciphered HD signal DXD is converted to feedback data DFD in the form of y-bit word sequence data. The feedback data DFD obtained from the bit number converting portion 47 are fed back to the register 44 as input data.

Under the condition where the operation of the register 44 is reset at each line period of the modified HD signal DOD' supplied to the enciphering portion 40, the register 44 is operative first to send register output data DRZ obtained in response to the frame number data DFR obtained from the frame number data extracting portion 57 and then to send the register output data DRZ obtained in response to the feedback data DFD obtained from the bit number converting portion 47 at each frame period of the modified HD signal DOD'.

Figure 16:
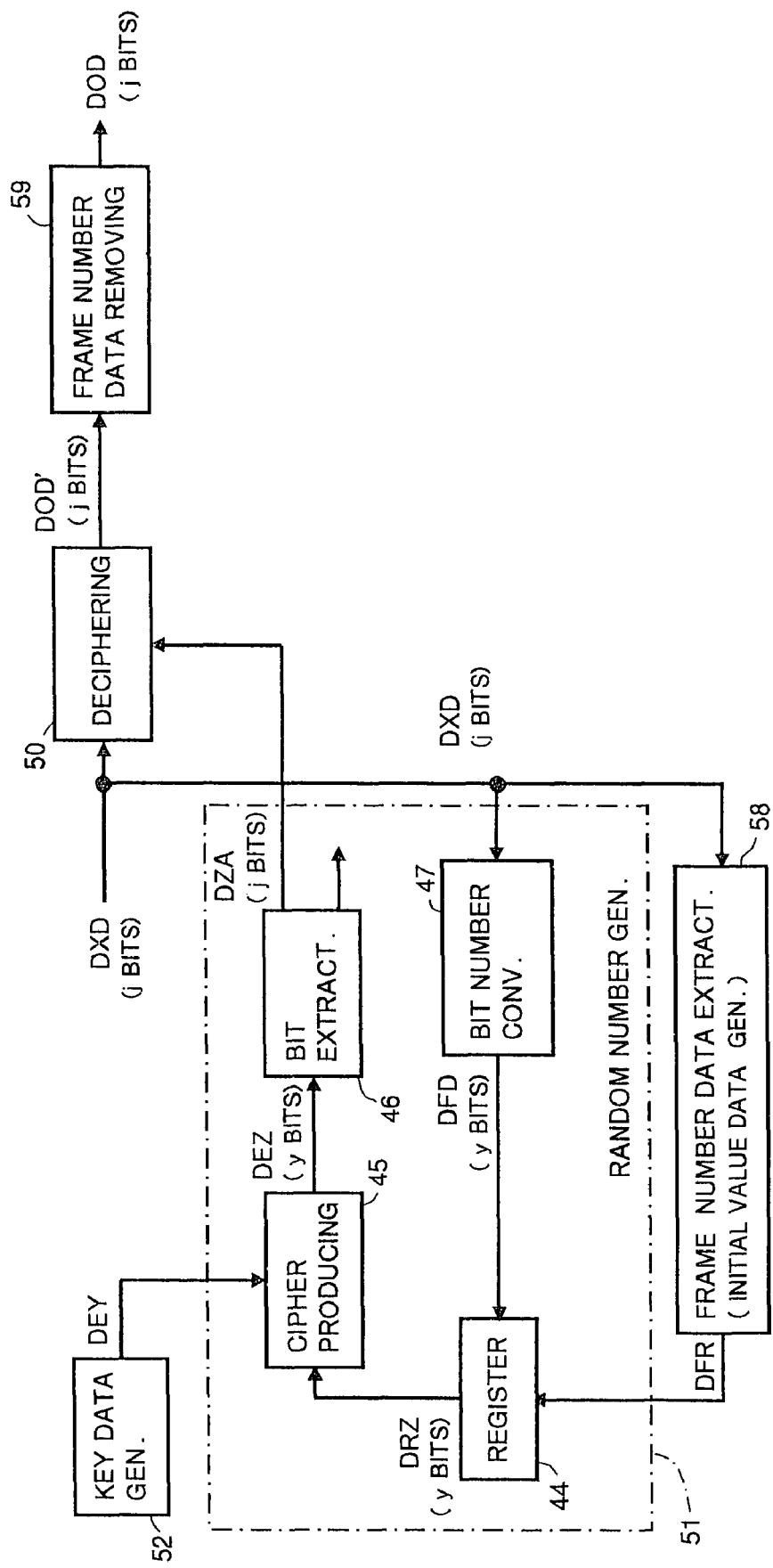
FIG. 16 is a schematic block diagram showing an embodiment of apparatus for deciphering data according to the invention claimed in claim 25 or 26.

FIG. 16 shows an embodiment of apparatus for deciphering data according to the invention claimed in claim 25 or 26. This embodiment is used for subjecting the enciphered HD signal DXD obtained from the apparatus for enciphering data shown in FIG. 14 to deciphering process to reproduce the HD signal DOD as original digital information data.

The embodiment shown in FIG. 16 is constituted with a deciphering portion 50 to which the enciphered HD signal DXD in the form of j-bit word sequence data produced in the enciphering portion 40 shown in FIG. 14, is supplied as input data, a random number generator 51, a key data generator 52 operative to supply the random number generator 51 with key data DEY, a frame number data extracting portion 58 to which the enciphered HD signal DXD is supplied as well as the deciphering portion 50 and a frame number data removing portion 59 connected with an output end of the deciphering portion 50.

The frame number data extracting portion 58 is operative to extract, from the enciphered HD signal, frame number data DFR which represent a frame number varying frame by frame in the enciphered HD signal DXD and supply the random number generator 51 with the extracted frame number data DFR.

The random number generator 51 is constituted with a register 44, a cipher producing portion 45, a bit extracting portion 46 and a bit number converting portion 47 in the similar manner as the random number generator 41 shown in FIG. 14, in order to supply the deciphering portion 50 with pseudo-random number data DZA composed of j-bit words.

The enciphered HD signal DXD is supplied to the bit number converting portion 47 as well as the deciphering portion 50 and output data (DFD) obtained from the bit number converting portion 47 are supplied to the register 44 as input data from the outside. The key data generator 52 is provided in the same manner as the key data generator 42 shown in FIG. 14.

Accordingly, in the random number generator 51 of the embodiment shown in FIG. 16 also, the frame number data DFR obtained from the frame number data extracting portion 58 are supplied to the register 44 as initial value data. The frame number data extracting portion 58 constitutes an initial value data generator for sending the frame number data DFR to be supplied to the register 44 in the random number generator 51 as the initial value data. The register 44 is so arranged, under the condition where the frame number data DFR obtained from the frame number data extracting portion 58 are supplied thereto, that the operation of the register 44 is reset at each line period of the enciphered HD signal DXD supplied to the deciphering portion 50.

Under the condition where the operation of the register 44 is reset at each line period of the enciphered HD signal DXD supplied to the deciphering portion 50, the register 44 is operative first to send register output data DRZ obtained in response to the frame number data DFR obtained from the frame number data extracting portion 58 and then to send the register output data DRZ obtained in response to output data DFD obtained from the bit number converting portion 47 at each frame period of the enciphered HD signal DXD.

Incidentally, the random number generator 51 may produce random number data (genuine random number data) in place of the pseudo-random number data DZA. In such a case, the random number data are sent from the random number generator 51 to be supplied to the deciphering portion 50.

Under such a situation as mentioned above, the deciphering portion 50 is operative to subject the enciphered HD signal DXD to deciphering process responding to the pseudo-random number data DZA or the random number data obtained from the random number generator 51 to reproduce modified HD signal DOD' in the form of j-bit word sequence data based on the enciphered HD signal DXD and supply the frame number data removing portion 59 with the reproduced modified HD signal DOD'.

When the modified HD signal DOD' is reproduced by subjecting the enciphered HD signal DXD to the enciphering process, enciphered video data in a portion corresponding to each line period of the enciphered HD signal DXD are subjected to the deciphering process to produce video data DVV which are provided in a portion corresponding to a video data period and time reference code data EAV which are provided in a starting end of a portion corresponding to a horizontal blanking period successive to the portion corresponding to the video data period in a portion corresponding to each line period of the enciphered HD signal DXD. The reproduced video data DVV and time reference code data EAV are combined with various data provided in the portion corresponding to the horizontal blanking period in the portion corresponding to each line period of the enciphered HD signal DXD except the time reference code data EAV, that is, line number data DLN, error detecting code data CRCC, ancillary data DAA including audio data, which have not been subjected to the enciphering process. As a result, the modified HD signal DOD' which contains the various data provided in the portion corresponding to the horizontal blanking period except the time reference code data EAV and the video data successive to the various data is reproduced.

In the frame number data removing portion 59, the frame number data DFR contained in the portion corresponding to the horizontal blanking period of the modified HD signal DOD' are removed from the modified HD signal DOD' obtained from the deciphering portion 50 to reproduce the original HD signal DOD as digital information data in the form of j-bit word sequence data.

Figure 17:
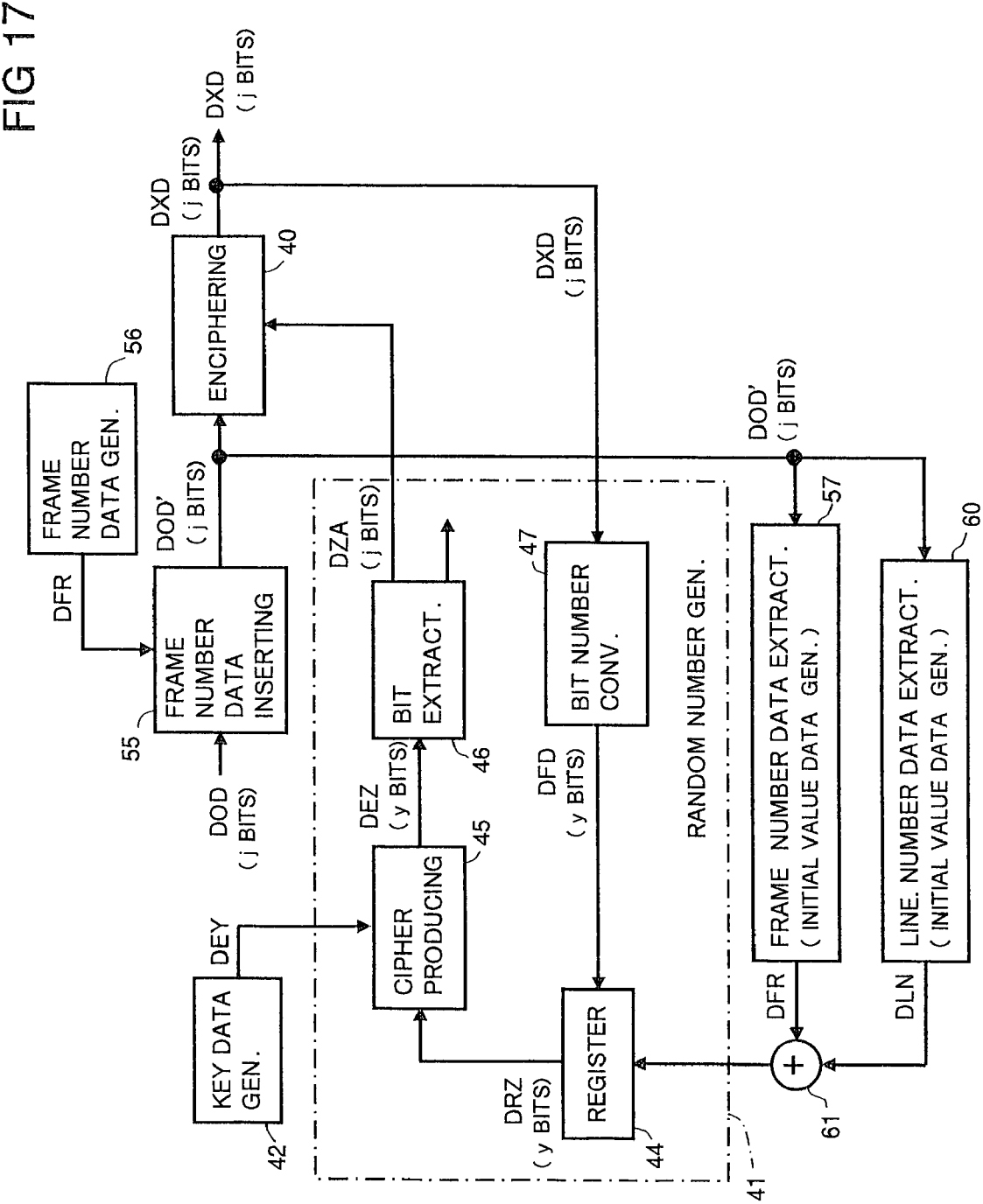
FIG. 17 is a schematic block diagram showing an embodiment of apparatus for enciphering data according to the invention claimed in claim 6 or 7.

FIG. 17 shows an embodiment of apparatus for enciphering data according to the invention claimed in claim 6 or 7.

The embodiment shown in FIG. 17 corresponds to a variation obtained by adding a line number data extracting portion 60 and a data adder 61 to the embodiment shown in FIG. 14. In FIG. 17, circuit blocks, signals and data corresponding to those of FIG. 14 are marked with the same references and further description thereof will be omitted.

In the embodiment shown in FIG. 17, a modified HD signal DOD' is supplied to the line number data extracting portion 60 as well as an enciphering portion 40. The line number data extracting portion 60 is operative to extract, from the modified HD signal DOD', line number data DLN which represent a line number varying line by line in the modified HD signal DOD', and supply a random number generator 41 with the extracted line number data DLN through the data adder 61.

Frame number data DFR obtained from a frame number data extracting portion 57 are supplied also through the data adder 61 to the random number generator 41. In the random number generator 41, the frame number data DFR obtained from the frame number data extracting portion 57 and the line number data DLN obtained from the line number data extracting portion 60 are supplied to the register 44 as initial value data. Each of the frame number data extracting portion 57 and the line number data extracting portion 60 constitutes an initial value data generator for sending the frame number data DFR or the line number data DLN to be supplied to the register 44 in the random number generator 41 as the initial value data.

Under the condition where the operation of the register 44 is reset at each line period of the modified HD signal DOD' supplied to the enciphering portion 40, the register 44 is operative to send register output data DRZ obtained in response to the frame number data DFR obtained from the frame number data extracting portion 58 at each frame period of the modified HD signal DOD' and further operative first to send the register output data DRZ obtained in response to the line number data DLN obtained from the line number data extracting portion 60 and then to send the register output data DRZ obtained in response to feedback data DFD obtained from a bit number converting portion 47 at each line period of the modified HD signal DOD'.

Other operations of the embodiment shown in FIG. 17 are performed in the same manner as those of the embodiment shown in FIG. 14.

Figure 18:
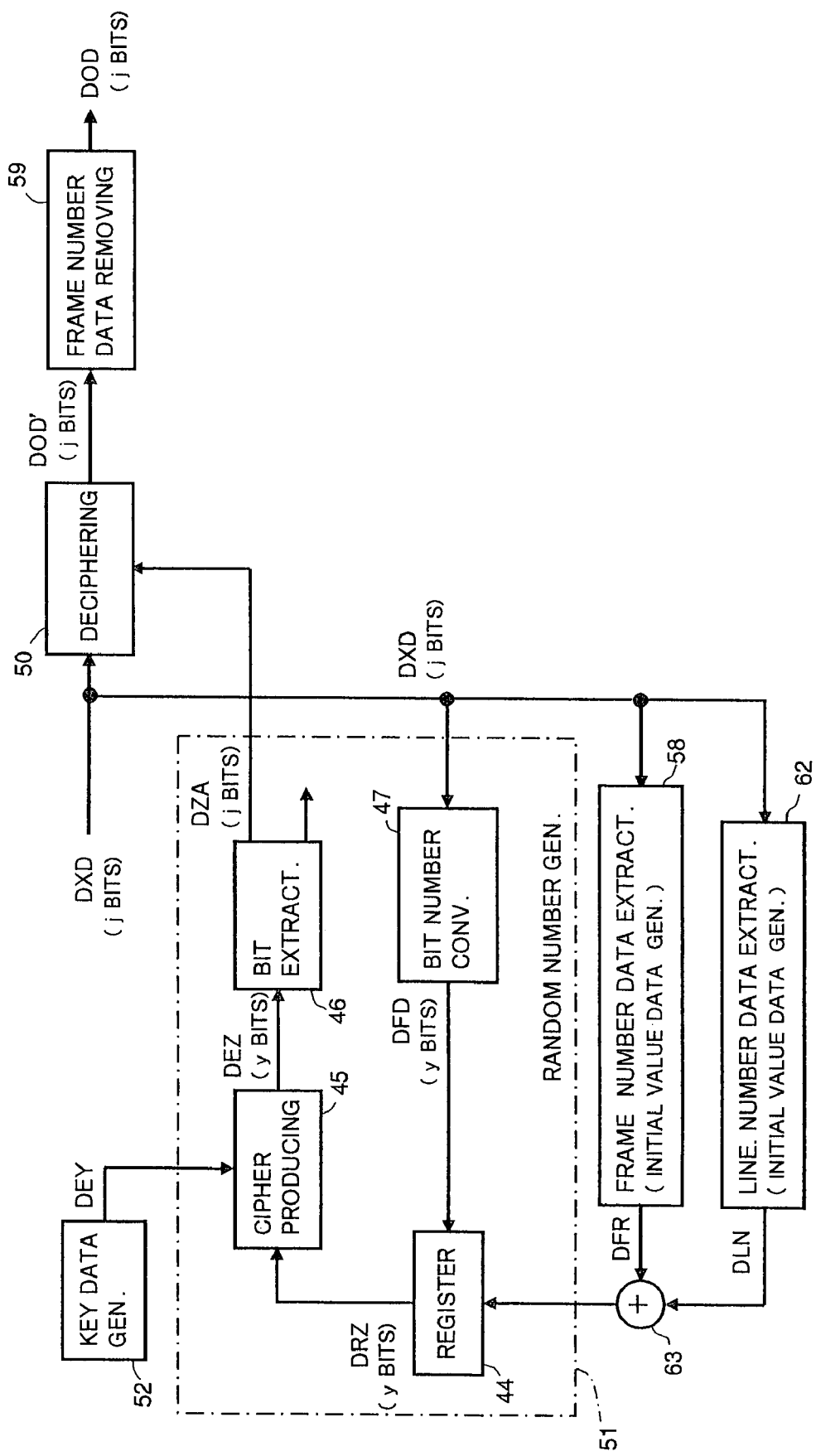
FIG. 18 is a schematic block diagram showing an embodiment of apparatus for deciphering data according to the invention claimed in claim 27 or 28.

FIG. 18 shows an embodiment of apparatus for deciphering data according to the invention claimed in claim 27 or 28. This embodiment is used for subjecting the enciphered HD signal DXD obtained from the apparatus for enciphering data shown in FIG. 17 to deciphering process to reproduce the HD signal DOD as original digital information data.

The embodiment shown in FIG. 18 corresponds to a variation obtained by adding a line number data extracting portion 62 and a data adder 63 to the embodiment shown in FIG. 16. In FIG. 18, circuit blocks, signals and data corresponding to those of FIG. 16 are marked with the same references and further description thereof will be omitted.

In the embodiment shown in FIG. 18, the enciphered HD signal DXD is supplied to the line number data extracting portion 62 as well as a deciphering portion 50. The line number data extracting portion 62 is operative to extract, from the enciphered HD signal DXD, line number data DLN which represent a line number varying line by line in the enciphered HD signal DXD and supply a random number generator 51 with the extracted line number data DLN through the data adder 63.

Frame number data DFR obtained from a frame number data extracting portion 58 are supplied also through the data adder 63 to the random number generator 51. In the random number generator 51, the frame number data DFR obtained from the frame number data extracting portion 58 and the line number data DLN obtained from the line number data extracting portion 62 are supplied to the register 44 as initial value data. Each of the frame number data extracting portion 58 and the line number data extracting portion 62 constitutes an initial value data generator for sending the frame number data DFR or the line number data DLN to be supplied to the register 44 in the random number generator 51 as the initial value data.

Under the condition where the operation of the register 44 is reset at each line period of the enciphered HD signal DXD supplied to the deciphering portion 50, the register 44 is operative to send register output data DRZ obtained in response to the frame number data DFR obtained from the frame number data extracting portion 58 at each frame period of the enciphered HD signal DXD and further operative first to send the register output data DRZ obtained in response to the line number data DLN obtained from the line number data extracting portion 62 and then to send the register output data DRZ obtained in response to feedback data DFD obtained from a bit number converting portion 47 at each line period of the enciphered HD signal DXD.

Other operations of the embodiment shown in FIG. 18 are performed in the same manner as those of the embodiment shown in FIG. 16.

In the embodiment of apparatus for enciphering data shown in each of FIGS. 12, 14 and 17, one or both of the line number data extracting portion 43 or 60 and the frame number data extracting portion 57 are provided for constituting the initial value data generator for sending one or both of the line number data which represent the line number varying line by line in the HD signal set to be enciphered in the enciphering portion 40 and the frame number data which represent the frame number varying frame by frame in the HD signal set to be enciphered in the enciphering portion 40 to be supplied to the register 44 in the random number generator 41 as the initial value data. Therefore, under the condition where the production of the pseudo-random number data or random number data is reset at each line period of the HD signal, the pseudo-random number data or random number data are prevented from appearing to be the same at each line or frame period of the HD signal. As a result, it comes to be hard to assume the contents of the original HD signal on the strength of the enciphered HD signal and therefore the enciphered HD signal is improved in its cipher strength.

Further, with the embodiment of apparatus for deciphering data shown in each of FIGS. 13, 15 and 18, the deciphering process to which the enciphered HD signal, which is obtained by subjecting the HD signal to the enciphered process for improving the cipher strength in the embodiment of apparatus for enciphering data shown in each of FIGS. 12, 14 and 17, is subjected is appropriately carried out in response to the pseudo-random number date or the random number date to reproduce the original HD signal in the deciphering portion 50.

FIG. 19 shows an embodiment of apparatus for enciphering data according to the invention claimed in any one of claims 8 to 10.

The embodiment shown in FIG. 19 is constituted with an enciphering portion 70 to which an HD signal DOD as shown in FIG. 5 is supplied as digital information data in the form of j-bit word sequence data, a line number data generator 71 operative to extract line number data DLN from the HD signal DOD supplied thereto as well as the enciphering portion 70 and send the extracted line number data DLN, a register 72 for holding the line number data DLN obtained from the line number data generator 71, a key data generator 73 for sending key data DEY, and an operation processor 74 to which the line number data DLN held by the register 72 and the key data DEY sent from the key data generator 73 are supplied.

The line number data generator 71 constitutes an information data generator for sending information data which vary at each data partition of digital information data such as the HD signal DOD and is operative to send the line number data DLN extracted from the HD signal DOD as the information data which vary at each data partition of the digital information data.

The operation processor 74 is operative to subject the key data DEY and the line number data DLN to operation process to produce modified key data DXY which vary at each line period of the HD signal DOD supplied to the enciphering portion 70 in response to the line number data DLN and supply the enciphering portion 70 wit the modified key data DXY. The enciphering portion 70 is operative to subject the HD signal DOD to enciphering process in accordance with rules determined by the modified key data DXY to produce enciphered HD signal DXD based on the HD signal DOD as enciphered digital information data in the form of j-bit word sequence data.

The enciphering process for the HD signal DOD in the enciphering portion 70 is carried out in the same manner as the enciphering process for the HD signal DOD in the enciphering portion 40 shown in FIG. 12. The enciphered HD signal DXD is formed to contain therein the line number data DLN, error detecting code data CRCC, ancillary data DAA and time reference code data SAV which are not enciphered and provided in a portion corresponding to a horizontal blanking period and enciphered video data which are obtained by subjecting video data DVV and time reference code data EAV to the enciphered process and provided to be successive to the time reference code data SAV.

FIG. 20 shows an embodiment of apparatus for deciphering data according to the invention claimed in any one of claims 29 to 31. This embodiment is used for subjecting the enciphered HD signal DXD obtained from the apparatus for enciphering data shown in FIG. 19 to deciphering process to reproduce the HD signal DOD as original digital information data.

The embodiment shown in FIG. 20 is constituted with a deciphering portion 80 to which the enciphered HD signal DXD is supplied as enciphered digital information data in the form of j-bit word sequence data, a line number data generator 81 operative to extract line number data DLN from the enciphered HD signal DXD supplied thereto as well as the deciphering portion 80 and send the extracted line number data DLN, a register 82 for holding the line number data DLN obtained from the line number data generator 81, a key data generator 73 for sending key data DEY, and an operation processor 83 to which the line number data DLN held by the register 82 and the key data DEY sent from the key data generator 73 are supplied. The key data generator 73 corresponds to the key data generator 73 shown in FIG. 19.

The line number data generator 81 constitutes an information data generator for sending information data which vary at each data partition of enciphered digital information data such as the enciphered HD signal DXD and is operative to send the line number data DLN extracted from the enciphered HD signal DXD as the information data which vary at each data partition of the enciphered digital information data.

The operation processor 83 is operative to subject the key data DEY and the line number data DLN to operation process to produce modified key data DXY which vary at each line period of the enciphered HD signal DXD supplied to the deciphering portion 80 in response to the line number data DLN and supply the deciphering portion 80 wit the modified key data DXY. The deciphering portion 80 is operative to subject the enciphered HD signal DXD to enciphering process in accordance with rules determined by the modified key data DXY to reproduce the original HD signal DOD based on the enciphered HD signal DXD as original digital information data in the form of j-bit word sequence data.

The deciphering process for the enciphered HD signal DXD in the deciphering portion 80 is carried out in the same manner as the deciphering process for the enciphered HD signal DXD in the deciphering portion 50 shown in FIG. 13. The original HD signal DOD is formed to contain therein the line number data DLN, error detecting code data CRCC, ancillary data DAA and time reference code data SAV which are provided in the portion corresponding to a horizontal blanking period and the video data portion containing the video data DVV and time reference code data EAV and provided to be successive to the time reference code data SAV.

FIG. 21 shows an embodiment of apparatus for enciphering data according to the invention claimed in any one of claims 11 to 13.

The embodiment shown in FIG. 21 is constituted with an enciphering portion 70, a key data generator 73 for supplying the enciphering portion 70 with key data DEY, an operation processor 75 to which an HD signal DOD as shown in FIG. 5 is supplied as digital information data in the form of j-bit word sequence data, a line number data generator 71 operative to extract line number data DLN from the HD signal DOD supplied thereto as well as the operation processor 75 and send the extracted line number data DLN, and a register 72 for holding the line number data DLN obtained from the line number data generator 71.

The line number data generator 71, register 72 and key data generator 73 correspond to the line number data generator 71, register 72 and key data generator 73 shown in FIG. 19, respectively, and the line number data generator 71 constitutes an information data generator for sending information data which vary at each data partition of digital information data such as the HD signal DOD and is operative to send the line number data DLN extracted from the HD signal DOD as the information data which vary at each data partition of the digital information data.

The line number data DLN held by the register 72 are supplied to the operation processor 75. The operation processor 75 is operative to subject the HD signal DOD and the line number data DLN to operation process to produce a modified HD signal DODP which varies at each line period of the HD signal DOD in response to the line number data DLN and supply the enciphering portion 70 wit the modified HD signal DODP.

The enciphering portion 70 is operative to subject the modified HD signal DODP to enciphering process in accordance with rules determined by the key data DEY to produce enciphered HD signal DXD based on the modified HD signal DODP as enciphered digital information data in the form of j-bit word sequence data.

The enciphering process for the modified HD signal DODP in the enciphering portion 70 is carried out in the same manner as the enciphering process for the HD signal DOD in the enciphering portion 70 shown in FIG. 19.

Figure 22:
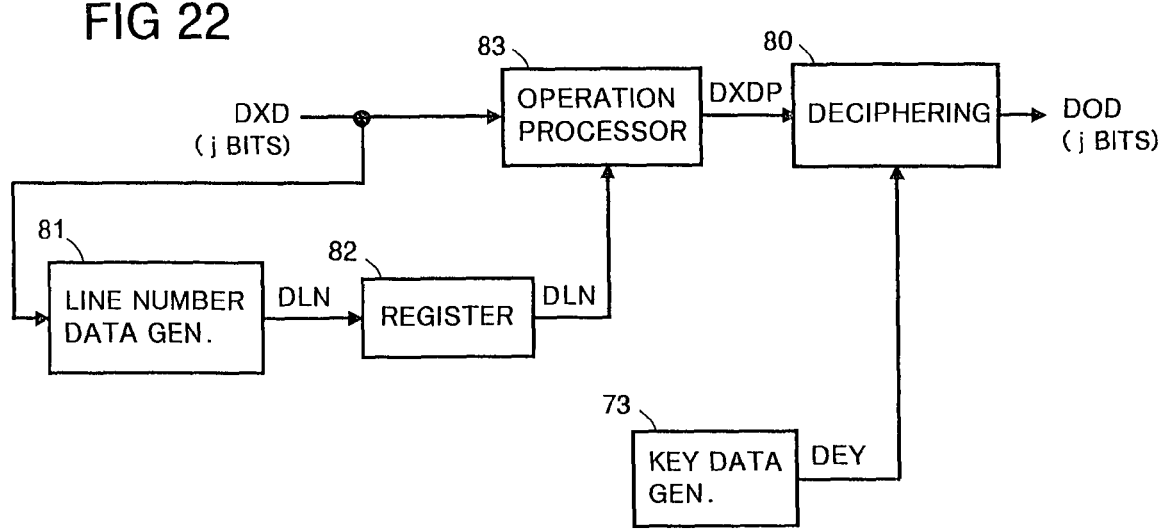
FIG. 22 is a schematic block diagram showing an embodiment of apparatus for deciphering data according to the invention claimed in any one of claims 32 to 34.

FIG. 22 shows an embodiment of apparatus for deciphering data according to the invention claimed in any one of claims 32 to 34. This embodiment is used for subjecting the enciphered HD signal DXD obtained from the apparatus for enciphering data shown in FIG. 21 to deciphering process to reproduce the HD signal DOD as original digital information data.

The embodiment shown in FIG. 22 is constituted with a deciphering portion 80, a key data generator 73 for supplying the deciphering portion 80 with key data DEY, an operation processor 83 to which the enciphered HD signal DXD obtained from the apparatus for enciphering data shown in FIG. 21 is supplied as digital information data in the form of j-bit word sequence data, a line number data generator 81 operative to extract line number data DLN from the enciphered HD signal DXD supplied thereto as well as the operation processor 83 and send the extracted line number data DLN, and a register 82 for holding the line number data DLN obtained from the line number data generator 81.

The line number data generator 81, register 82 and key data generator 73 correspond to the line number data generator 81, register 82 and key data generator 73 shown in FIG. 20, respectively, and the line number data generator 81 constitutes an information data generator for sending information data which vary at each data partition of digital information data such as the enciphered HD signal DXD and is operative to send the line number data DLN extracted from the enciphered HD signal DXD as the information data which vary at each data partition of the digital information data.

The line number data DLN held by the register 82 are supplied to the operation processor 83. The operation processor 83 is operative to subject the enciphered HD signal DXD and the line number data DLN held by the register 82 to operation process to produce a modified enciphered HD signal DXDP which varies at each line period of the enciphered HD signal DXD in response to the line number data DLN and supply the deciphering portion 80 wit the modified enciphered HD signal DXDP.

The deciphering portion 80 is operative to subject the modified enciphered HD signal DXDP to enciphering process in accordance with rules determined by the key data DEY to reproduce the original HD signal DOD based on the modified enciphered HD signal DXDP as original digital information data in the form of j-bit word sequence data.

The deciphering process for the modified enciphered HD signal DXDP in the deciphering portion 80 is carried out in the same manner as the deciphering process for the enciphered HD signal DXD in the deciphering portion 80 shown in FIG. 20.

Figure 23:
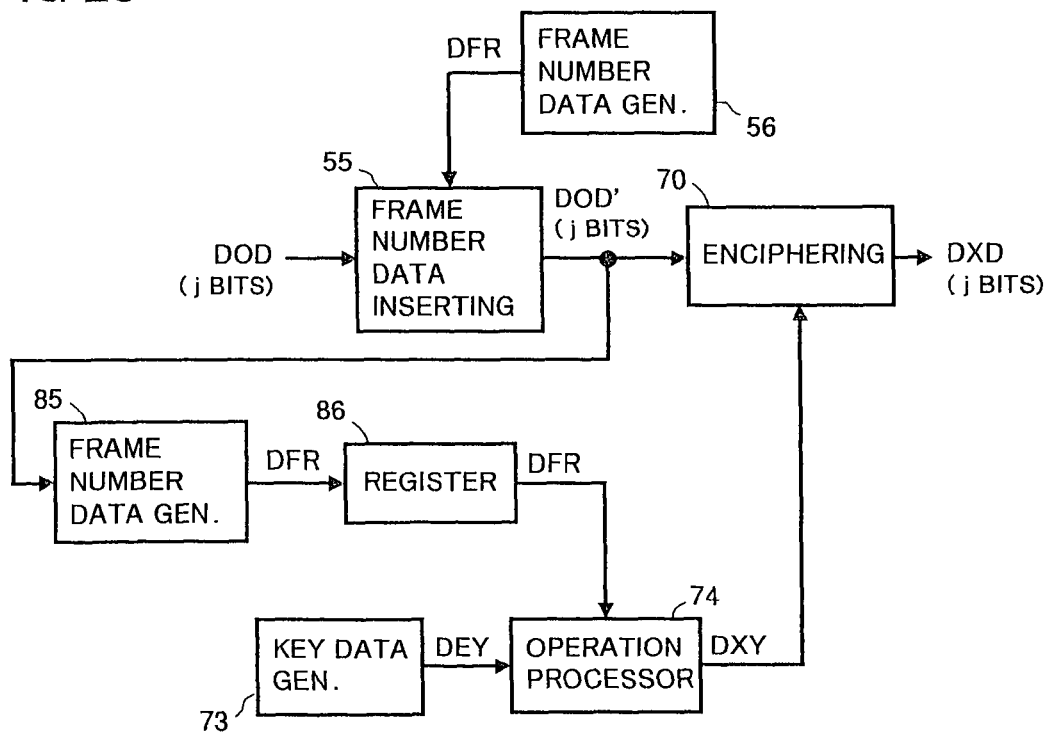
FIG. 23 is a schematic block diagram showing an embodiment of apparatus for enciphering data according to the invention claimed in claim 14 or 15.

FIG. 23 shows an embodiment of apparatus for enciphering data according to the invention claimed in claim 14 or 15.

In the embodiment shown in FIG. 23, a frame number data inserting portion 55 to which an HD signal DOD as shown in FIG. 5 is supplied as digital information data in the form of j-bit word sequence data, and a frame number data generator 56 for supplying the frame number data inserting portion 55 with frame number data DFR which represent a frame number varying frame by frame in the HD signal DOD, are provided.

The frame number data inserting portion 55 and frame number data generator 56 correspond to the frame number data inserting portion 55 and frame number data generator 56 shown in each of FIGS. 14 and 17, respectively, and the frame number data inserting portion 55 is operative to insert the frame number data DFR from the frame number data generator 56 into a part containing ancillary data DM in a portion corresponding to each horizontal blanking period of the HD signal DOD to produce a modified HD signal DOD' having the portion corresponding to each horizontal blanking period which contains the frame number data DFR in addition to the ancillary data DAA, as shown in FIG. 15.

Further, the embodiment shown in FIG. 23 is constituted with, in addition to the frame number data inserting portion 55 and the frame number data generator 56, an enciphering portion 70 to which the modified HD signal DOD' obtained from the frame number data inserting portion 55 is supplied as input data, a frame number data generator 85 operative to extract the frame number data DFR from the modified HD signal DOD' supplied thereto as well as the enciphering portion 70 and send the extracted frame number data DFR, a register 86 for holding the frame number data DFR obtained from the frame number data generator 85, a key data generator 73 for sending key data DEY, and an operation processor 74 to which the frame number data DFR held by the register 86 and the key data DEY sent from the key data generator 73 are supplied.

The frame number data generator 85 constitutes an information data generator for sending information data which vary at each data partition of digital information data such as the modified HD signal DOD' and is operative to send the frame number data DFR extracted from the modified HD signal DOD' as the information data which vary at each data partition of the digital information data.

The key data generator 73 and the operation processor 74 correspond to the key data generator 73 and the operation processor 74 shown in FIG. 19, respectively, and the operation processor 74 is operative to subject the key data DEY and the frame number data DFR to operation process to produce modified key data DXY which vary at each frame period of the modified HD signal DOD' supplied to the enciphering portion 70 in response to the frame number data DFR and supply the enciphering portion 70 wit the modified key data DXY. The enciphering portion 70 is operative to subject the modified HD signal DOD' to enciphering process in accordance with rules determined by the modified key data DXY to produce enciphered HD signal DXD based on the modified HD signal DOD' as enciphered digital information data in the form of j-bit word sequence data.

The enciphering process for the modified HD signal DOD' in the enciphering portion 70 is carried out in the same manner as the enciphering process for the modified HD signal DOD' in the enciphering portion 40 shown in FIG. 14.

FIG. 24 shows an embodiment of apparatus for deciphering data according to the invention claimed in claim 35 or 36. This embodiment is used for subjecting the enciphered HD signal DXD obtained from the apparatus for enciphering data shown in FIG. 23 to deciphering process to reproduce the HD signal DOD as original digital information data.

The embodiment shown in FIG. 24 is constituted with a deciphering portion 80 to which the enciphered HD signal DXD is supplied as enciphered digital information data in the form of j-bit word sequence data, a frame number data generator 87 operative to extract frame number data DFR from the enciphered HD signal DXD supplied thereto as well as the deciphering portion 80 and send the extracted frame number data DFR, a register 88 for holding the frame number data DFR obtained from the frame number data generator 87, a key data generator 73 for sending key data DEY, an operation processor 89 to which the frame number data DFR held by the register 88 and the key data DEY sent from the key data generator 73 are supplied, and a frame number data removing portion 90 connected with an output end of the deciphering portion 80. The key data generator 73 corresponds to the key data generator 73 shown in FIG. 23.

The frame number data generator 87 constitutes an information data generator for sending information data which vary at each data partition of enciphered digital information data such as the enciphered HD signal DXD and is operative to send the frame number data DFR extracted from the enciphered HD signal DXD as the information data which vary at each data partition of the enciphered digital information data.

The operation processor 89 is operative to subject the key data DEY and the frame number data DFR to operation process to produce modified key data DXY which vary at each frame period of the enciphered HD signal DXD supplied to the deciphering portion 80 in response to the frame number data DFR and supply the deciphering portion 80 wit the modified key data DXY. The deciphering portion 80 is operative to subject the enciphered HD signal DXD to enciphering process in accordance with rules determined by the modified key data DXY to reproduce the modified HD signal DOD' based on the enciphered HD signal DXD as original digital information data in the form of j-bit word sequence data and supply the frame number data removing portion 90 with the modified HD signal DOD'.

The deciphering process for the enciphered HD signal DXD in the deciphering portion 80 is carried out in the same manner as the deciphering process for the enciphered HD signal DXD in the deciphering portion 80 shown in FIG. 20.

In the frame number data removing portion 90, the frame number data DFR contained in the portion corresponding to the horizontal blanking period of the modified HD signal DOD' are removed from the modified HD signal DOD' obtained from the deciphering portion 80 to reproduce the original HD signal DOD as digital information data in the form of j-bit word sequence data.

FIG. 25 shows an embodiment of apparatus for enciphering data according to the invention claimed in claim 16 or 17.

In the embodiment shown in FIG. 25, a frame number data inserting portion 55 to which an HD signal DOD as shown in FIG. 5 is supplied as digital information data in the form of j-bit word sequence data, and a frame number data generator 56 for supplying the frame number data inserting portion 55 with frame number data DFR which represent a frame number varying frame by frame in the HD signal DOD, are provided.

The frame number data inserting portion 55 and frame number data generator 56 correspond to the frame number data inserting portion 55 and frame number data generator 56 shown in each of FIGS. 14, 17 and 23, respectively, and the frame number data inserting portion 55 is operative to insert the frame number data DFR from the frame number data generator 56 into a part containing ancillary data DAA in a portion corresponding to each horizontal blanking period of the HD signal DOD to produce a modified HD signal DOD' having the portion corresponding to each horizontal blanking period which contains the frame number data DFR in addition to the ancillary data DAA, as shown in FIG. 15.

Further, the embodiment shown in FIG. 25 is constituted with, in addition to the frame number data inserting portion 55 and the frame number data generator 56, an enciphering portion 70, a key data generator 73 for sending key data DEY, an operation processor 91 to which the modified HD signal DOD' obtained from the frame number data inserting portion 55 are supplied, a frame number data generator 85 operative to extract the frame number data DFR from the modified HD signal DOD' supplied thereto as well as the operation processor 91 and send the extracted frame number data DFR, and a register 86 for holding the frame number data DFR obtained from the frame number data generator 85.

The frame number data generator 85, the register 86 and the key data generator 73 correspond to the frame number data generator 85, the register 86 and the key data generator 73 shown in FIG. 23, and the frame number data generator 85 constitutes an information data generator for sending information data which vary at each data partition of digital information data such as the modified HD signal DOD' and is operative to send the frame number data DFR extracted from the modified HD signal DOD' as the information data which vary at each data partition of the digital information data.

The frame number data DFR held by the register 86 are supplied to the operation processor 91. The operation processor 91 is operative to subject the modified HD signal DOD' and the frame number data DFR held by the register 86 to operation process to produce a modified HD signal DODP' which varies at each frame period of the modified HD signal DOD' in response to the frame number data DFR and supply the enciphering portion 70 wit the modified HD signal DODP'.

The enciphering portion 70 is operative to subject the modified HD signal DODP' obtained from the operation processor 91 to enciphering process in accordance with rules determined by the key data DEY to produce enciphered HD signal DXD based on the modified HD signal DODP' as enciphered digital information data in the form of j-bit word sequence data.

The enciphering process for the modified HD signal DODP' in the enciphering portion 70 is carried out in the same manner as the enciphering process for the modified HD signal DOD' in the enciphering portion 70 shown in FIG. 23.

Figure 26:
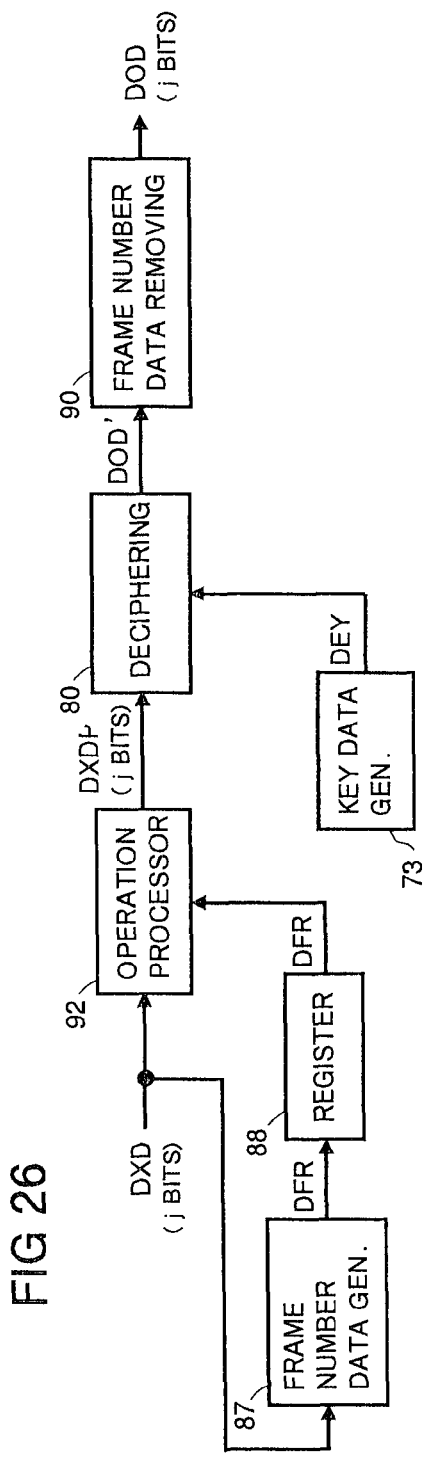
FIG. 26 is a schematic block diagram showing an embodiment of apparatus for deciphering data according to the invention claimed in claim 37 or 38.

FIG. 26 shows an embodiment of apparatus for deciphering data according to the invention claimed in claim 37 or 38. This embodiment is used for subjecting the enciphered HD signal DXD obtained from the apparatus for enciphering data shown in FIG. 25 to deciphering process to reproduce the HD signal DOD as original digital information data.

The embodiment shown in FIG. 26 is constituted with a deciphering portion 80, a key data generator 73 for sending key data DEY, an operation processor 92 to which the enciphered HD signal DXD in the form of j-bit word sequence data produced in the enciphering portion 70 shown in FIG. 25 is supplied, a frame number data generator 87 operative to extract the frame number data DFR from the enciphered HD signal DXD supplied thereto as well as the operation processor 92 and send the extracted frame number data DFR, a register 88 for holding the frame number data DFR obtained from the frame number data generator 87, and a frame number data removing portion 90 connected with an output end of the deciphering portion 80.

The frame number data generator 87, the register 88 and the frame number data removing portion 90 correspond to the frame number data generator 87, the register 88 and the frame number data removing portion 90 shown in FIG. 24, and the frame number data generator 87 constitutes an information data generator for sending information data which vary at each data partition of digital information data such as the enciphered HD signal DXD and is operative to send the frame number data DFR extracted from the enciphered HD signal DXD as the information data which vary at each data partition of the digital information data.

The frame number data DFR held by the register 86 are supplied to the operation processor 92. The operation processor 92 is operative to subject the enciphered HD signal DXD and the frame number data DFR held by the register 86 to operation process to produce a modified enciphered HD signal DXDP' which varies at each frame period of the enciphered HD signal DXD in response to the frame number data DFR and supply the deciphering portion 80 wit the modified enciphered HD signal DXDP'.

The deciphering portion 80 is operative to subject the modified enciphered HD signal DXDP' obtained from the operation processor 92 to enciphering process in accordance with rules determined by the key data DEY to reproduce the modified HD signal DOD' based on the modified enciphered HD signal DXDP' and supply the frame number data removing portion 90 with the modified HD signal DOD'.

The deciphering process for the modified enciphered HD signal DXDP' in the deciphering portion 80 is carried out in the same manner as the deciphering process for the modified enciphered HD signal DXDP in the deciphering portion 80 shown in FIG. 22.

In the frame number data removing portion 90, the frame number data DFR contained in the portion corresponding to the horizontal blanking period of the modified HD signal DOD' are removed from the modified HD signal DOD' obtained from the deciphering portion 80 to reproduce the original HD signal DOD as digital information data in the form of j-bit word sequence data.

Figure 27:
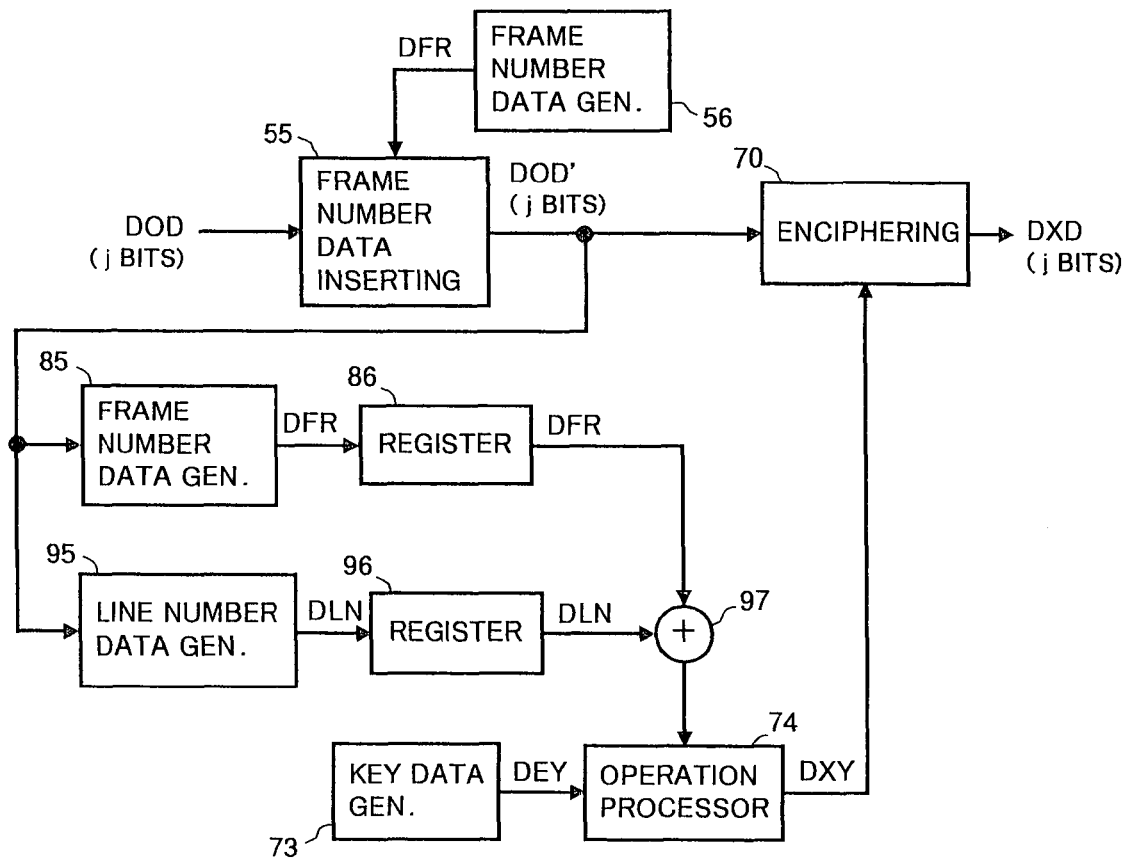
FIG. 27 is a schematic block diagram showing an embodiment of apparatus for enciphering data according to the invention claimed in claim 18 or 19.

FIG. 27 shows an embodiment of apparatus for enciphering data according to the invention claimed in claim 18 or 19.

The embodiment shown in FIG. 27 corresponds to a variation obtained by adding a line number data generator 95, a register 96 and a data adder 97 to the embodiment shown in FIG. 23. In FIG. 27, circuit blocks, signals and data corresponding to those of FIG. 23 are marked with the same references and further description thereof will be omitted.

In the embodiment shown in FIG. 27, a modified HD signal DOD' is supplied to the line number data generator 95 as well as an enciphering portion 70. The line number data generator 95 is operative to extract, from the modified HD signal DOD', line number data DLN which represent a line number varying line by line in the modified HD signal DOD' and supply the register 96 with the extracted line number data DLN.

The register 96 is operative to hold the line number data DLN obtained from the line number data generator 95 and supply an operation processor 74 with the line number data DLN through the data adder 97.

The frame number data DFR held by a register 86 are also supplied to the operation processor 74 through the data adder 97. In the operation processor 74, the line number data DLN obtained from the register 96, the frame number data DFR obtained from the register 86 and the key data DEY obtained from the key data generator 73 are subjected to operation process to produce modified key data DXY which vary at not only each frame period but also each line period of the modified HD signal DOD' to be supplied to the enciphering portion 70.

The enciphering portion 70 is operative to subject the modified HD signal DOD' obtained from the frame number data inserting portion 55 to enciphering process in accordance with rules determined by the modified key data DXY to produce the enciphered HD signal DXD based on the modified HD signal DOD'.

Other operations of the embodiment of apparatus for enciphering data shown in FIG. 27 are the same as those of the embodiment of apparatus for enciphering data shown in FIG. 23.

Figure 28:
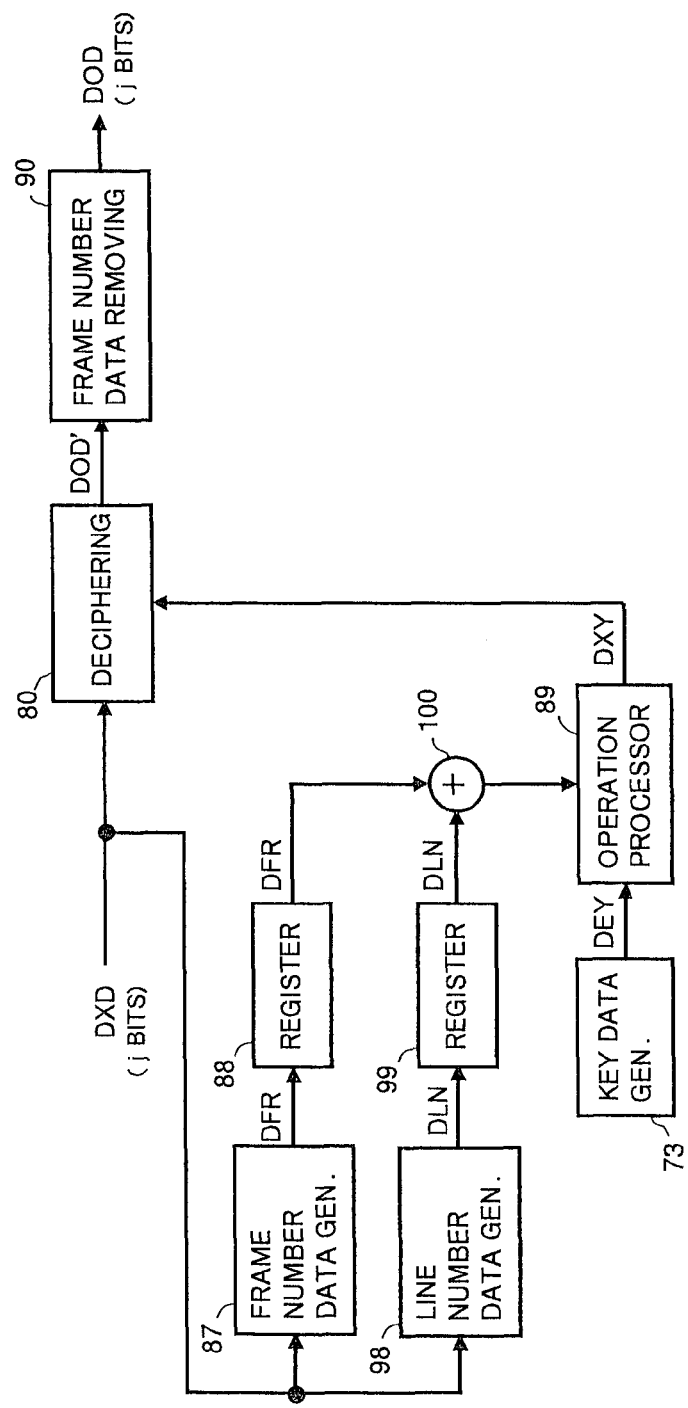
FIG. 28 is a schematic block diagram showing an embodiment of apparatus for deciphering data according to the invention claimed in claim 39 or 40.

FIG. 28 shows an embodiment of apparatus for deciphering data according to the invention claimed in claim 39 or 40. This embodiment is used for subjecting the enciphered HD signal DXD obtained from the apparatus for enciphering data shown in FIG. 27 to deciphering process to reproduce the HD signal DOD as original digital information data.

The embodiment shown in FIG. 28 corresponds to a variation obtained by adding a line number data generator 98, a register 99 and a data adder 100 to the embodiment shown in FIG. 24. In FIG. 28, circuit blocks, signals and data corresponding to those of FIG. 24 are marked with the same references and further description thereof will be omitted.

In the embodiment shown in FIG. 28, the enciphered HD signal DXD is supplied to the line number data generator 98 as well as a deciphering portion 80. The line number data generator 98 is operative to extract, from the enciphered HD signal DXD, line number data DLN which represent a line number varying line by line in the enciphered HD signal DXD and supply the register 99 with the extracted line number data DLN.

The register 99 is operative to hold the line number data DLN obtained from the line number data generator 98 and supply an operation processor 89 with the line number data DLN through the data adder 100.

The frame number data DFR held by a register 88 are also supplied to the operation processor 89 through the data adder 100. In the operation processor 89, the line number data DLN obtained from the register 99, the frame number data DFR obtained from the register 88 and the key data DEY obtained from the key data generator 73 are subjected to operation process to produce modified key data DXY which vary at not only each frame period but also each line period of the enciphered HD signal DXD to be supplied to the deciphering portion 80.

The deciphering portion 80 is operative to subject the enciphered HD signal DXD to enciphering process in accordance with rules determined by the modified key data DXY to reproduce the modified HD signal DOD' based on the enciphered HD signal DXD and supply a frame number data removing portion 90 with the modified HD signal DOD'.

Other operations of the embodiment of apparatus for deciphering data shown in FIG. 28 are the same as those of the embodiment of apparatus for deciphering data shown in FIG. 24.

FIG. 29 shows an embodiment of apparatus for enciphering data according to the invention claimed in claim 20 or 21.

The embodiment shown in FIG. 29 corresponds to a variation obtained by adding a line number data generator 95, a register 96 and a data adder 97 to the embodiment shown in FIG. 25. In FIG. 29, circuit blocks, signals and data corresponding to those of FIG. 25 are marked with the same references and further description thereof will be omitted.

In the embodiment shown in FIG. 29, a modified HD signal DOD' is supplied to the line number data generator 95 as well as an operation processor 91. The line number data generator 95 is operative to extract, from the modified HD signal DOD' obtained from a frame number data inserting portion 55, line number data DLN which represent a line number varying line by line in the modified HD signal DOD' and supply the register 96 with the extracted line number data DLN.

The register 96 is operative to hold the line number data DLN obtained from the line number data generator 95 and supply an operation processor 91 with the line number data DLN through the data adder 97.

The frame number data DFR held by a register 86 are also supplied to the operation processor 91 through the data adder 97. In the operation processor 91, the modified HD signal DOD' obtained from the frame number data inserting portion 55, the line number data DLN obtained from the register 96 and the frame number data DFR obtained from the register 86 are subjected to operation process to produce a modified HD signal DODP' which vary at not only each frame period but also each line period of the modified HD signal DOD' to be supplied to the enciphering portion 70.

Other operations of the embodiment of apparatus for enciphering data shown in FIG. 29 are the same as those of the embodiment of apparatus for enciphering data shown in FIG. 25.

FIG. 30 shows an embodiment of apparatus for deciphering data according to the invention claimed in claim 41 or 42. This embodiment is used for subjecting the enciphered HD signal DXD obtained from the apparatus for enciphering data shown in FIG. 29 to deciphering process to reproduce the HD signal DOD as original digital information data.

The embodiment shown in FIG. 30 corresponds to a variation obtained by adding a line number data generator 98, a register 99 and a data adder 100 to the embodiment shown in FIG. 26. In FIG. 30, circuit blocks, signals and data corresponding to those of FIG. 26 are marked with the same references and further description thereof will be omitted.

In the embodiment shown in FIG. 30, the enciphered HD signal DXD is supplied to the line number data generator 98 as well as an operation processor 92. The line number data generator 98 is operative to extract, from the enciphered HD signal DXD, line number data DLN which represent a line number varying line by line in the enciphered HD signal DXD and supply the register 99 with the extracted line number data DLN.

The register 99 is operative to hold the line number data DLN obtained from the line number data generator 98 and supply an operation processor 92 with the line number data DLN through the data adder 100.

The frame number data DFR held by a register 86 are also supplied to the operation processor 92 through the data adder 100. In the operation processor 92, the enciphered HD signal DXD, the line number data DLN obtained from the register 99 and the frame number data DFR obtained from the register 88 are subjected to operation process to produce a modified enciphered HD signal DXDP' which vary at not only each frame period but also each line period of the enciphered HD signal DXD to be supplied to the deciphering portion 80.

Other operations of the embodiment of apparatus for deciphering data shown in FIG. 30 are the same as those of the embodiment of apparatus for deciphering data shown in FIG. 26.

In the embodiment of apparatus for enciphering data shown in each of FIGS. 19, 23 and 27, the key data which are used for enciphering the HD signal to produce the enciphered HD signal in the enciphering portion 70 are modified to vary at each line period or each frame period of the HD signal set to be enciphered or at not only each line period but also each frame period of the HD signal set to be enciphered. As a result, it comes to be hard to assume the contents of the original HD signal on the strength of the enciphered HD signal and therefore the enciphered HD signal is improved in its cipher strength.

With the embodiment of apparatus for deciphering data shown in each of FIGS. 20, 24 and 28, the deciphering process to which the enciphered HD signal, which is obtained by subjecting the HD signal to the enciphered process for improving the cipher strength in the embodiment of apparatus for enciphering data shown in each of FIGS. 19, 23 and 27, is subjected is appropriately carried out to reproduce the original HD signal in the deciphering portion 80.

In the embodiment of apparatus for enciphering data shown in each of FIGS. 21, 25 and 29, the HD signal set to be enciphered is modified to vary at each line period or each frame period of the HD signal or at not only each line period but also each frame period of the HD signal and then enciphered in response to the key data in the enciphering portion 70. As a result, it comes to be hard to assume the contents of the original HD signal on the strength of the enciphered HD signal and therefore the enciphered HD signal is improved in its cipher strength.

Further, with the embodiment of apparatus for deciphering data shown in each of FIGS. 22, 26 and 30, the deciphering process to which the enciphered HD signal, which is obtained by subjecting the HD signal to the enciphered process for improving the cipher strength in the embodiment of apparatus for enciphering data shown in each of FIGS. 21, 25 and 29, is subjected is appropriately carried out to reproduce the original HD signal in the deciphering portion 80.

Figure 31:
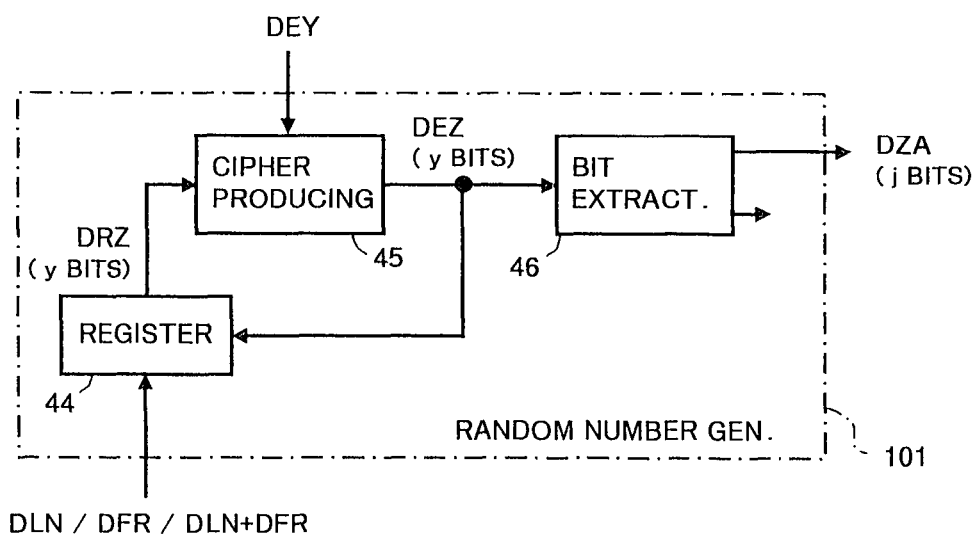
FIG. 31 is a schematic block diagram showing a random number generator which can be used in place of each of random number generators shown in FIGS. 12 to 14 and 16 to 18, respectively.

FIG. 31 shows a random number generator 101 which can be used in place of each of the random number generators 41 shown in FIGS. 12, 14 and 17 and the random number generators 51 shown in FIGS. 13, 16 and 18. That is, each of the embodiments of apparatus for enciphering data shown in FIGS. 12, 14 and 17, respectively, can be constituted to include the random number generator 101 in place of the random number generators 41 and each of the embodiments of apparatus for deciphering data shown in FIGS. 13, 16 and 18, respectively, can be constituted to include the random number generator 101 in place of the random number generators 51.

In the random number generator 101 shown in FIG. 31, although a cipher producing portion 45, a register 44 which constitutes a data supplying portion for supplying the cipher producing portion 45 with input data and a bit extracting portion 46 are provided, in the same manner as the situation in each of the random number generators 41 shown in FIGS. 12, 14 and 17 and the random number generators 51 shown in FIGS. 13, 16 and 18, any portion corresponding to the bit number converting portion 47 which is provided in each of the random number generators 41 shown in FIGS. 12, 14 and 17 and the random number generators 51 shown in FIGS. 13, 16 and 18, is not provided. Then, cipher data DEZ obtained from the cipher producing portion 45 are supplied to the bit extracting portion 46 and further supplied to the register 44 as feedback data.

Consequently, the register 44 is operative to send register output data DRZ produced in response to one or both of line number data DLN obtained from a line number data extracting portion 43, 53, 60 or 62 and frame number data DFR obtained from a frame number data extracting portion 57 or 58 which are supplied to the register 44 as initial value data and another register output data DRZ produced in response to the cipher data DEZ obtained from the cipher producing portion 45 which are supplied to the register 44 as feedback data.

APPLICABILITY FOR INDUSTRIAL USE

As apparent from the above description, in the apparatus for enciphering data constituted in accordance with the invention claimed in any one of claims 1 to 7 of the present application, for example, under the condition where the digital information data set to be enciphered are the HD signal, since the initial value data supplying portion is provided for supplying one or both of the line number data varying at each line period of the HD signal and the frame number data varying at each frame period of the HD signal to the data supplying portion for supplying the cipher producing portion with the input data, as the initial value data, when the production of the pseudo-random number data or random number data is reset at each line period of the HD signal, the pseudo-random number data or random number data are prevented from appearing to be the same at each line or frame period of the HD signal.

Consequently, with the apparatus for enciphering data constituted in accordance with the invention claimed in any one of claims 1 to 7 of the present application, it comes to be hard to assume the contents of the original digital information data, such as the original HD signal, on the strength of the enciphered digital information data, such as the enciphered HD signal, and therefore the enciphered digital information data are improved in its cipher strength.

In the apparatus for enciphering data constituted in accordance with the invention claimed in any one of claims 8 to 10, 14, 15, 18 and 19 of the present application, for example, under the condition where the digital information data set to be enciphered are the HD signal, since the information data generating portion is provided for sending one or both of the line number data varying at each line period of the HD signal and the frame number data varying at each frame period of the HD signal and the operation processing portion is also provided for subjecting the key data sent from the key data generating portion and one or both of the line number data varying at each line period of the HD signal and the frame number data varying at each frame period of the HD signal to the operation process to produce the modified key data and supplying the modified key data to the enciphering portion for producing the enciphered HD signal based on the HD signal, the key data used for the enciphering process through which the enciphered HD signal is obtained based on the HD signal are modified to vary at each line period or each frame period of the HD signal or at not only each line period but also each frame period of the HD signal.

Consequently, with the apparatus for enciphering data constituted in accordance with the invention claimed in any one of claims 8 to 10, 14, 15, 18 and 19 of the present application, it comes to be hard to assume the contents of the original digital information data, such as the original HD signal, on the strength of the enciphered digital information data, such as the enciphered HD signal, and therefore the enciphered digital information data are improved in its cipher strength.

In the apparatus for enciphering data constituted in accordance with the invention claimed in any one of claims 11 to 13, 16, 17, 20 and 21 of the present application, for example, under the condition where the digital information data set to be enciphered are the HD signal, since the information data generating portion is provided for sending one or both of the line number data varying at each line period of the HD signal and the frame number data varying at each frame period of the HD signal and the operation processing portion is also provided for subjecting the HD signal and one or both of the line number data varying at each line period of the HD signal and the frame number data varying at each frame period of the HD signal to the operation process to produce the modified HD signal and supplying the modified HD signal to the enciphering portion to which the key data are supplied, the HD signal set to be enciphered is modified to vary at each line period or each frame period thereof or at not only each line period but also each frame period thereof and then enciphered in response to the key data in the enciphering portion.

Consequently, with the apparatus for enciphering data constituted in accordance with the invention claimed in any one of claims 11 to 13, 16, 17, 20 and 21 of the present application, it comes to be hard to assume the contents of the original digital information data, such as the original HD signal, on the strength of the enciphered digital information data, such as the enciphered HD signal, and therefore the enciphered digital information data are improved in its cipher strength.

In the apparatus for deciphering data constituted in accordance with the invention claimed in any one of claims 22 to 28 of the present application, for example, under the condition where the enciphered digital information data are the enciphered HD signal, since the initial value data supplying portion is provided for supplying, as initial value data, one or both of the line number data varying at each line period of the enciphered HD signal and the frame number data varying at each frame period of the enciphered HD signal to the register for supplying the cipher producing portion with the input data, the deciphering process to which the enciphered HD signal, which is obtained by subjecting the HD signal to the enciphered process for improving the cipher strength, is subjected is appropriately carried out in response to the pseudo-random number date or the random number date to reproduce the original HD signal.

In the apparatus for deciphering data constituted in accordance with the invention claimed in any one of claims 29 to 31, 35, 36, 39 and 40 of the present application, for example, under the condition where the enciphered digital information data are the enciphered HD signal, since the information data generating portion is provided for sending one or both of the line number data varying at each line period of the enciphered HD signal and the frame number data varying at each frame period of the enciphered HD signal and the operation processing portion is also provided for subjecting the key data obtained from the key data generator and one or both of the line number data varying at each line period of the enciphered HD signal and the frame number data varying at each frame period of the enciphered HD signal to the operation process to produce the modified key data and supplying the modified key data to the deciphering portion in which the HD signal is reproduced based on the enciphered HD signal, the deciphering process to which the enciphered HD signal, which is obtained by subjecting the HD signal to the enciphered process for improving the cipher strength, is subjected is appropriately carried out in response to the key date to reproduce the original HD signal.

In the apparatus for deciphering data constituted in accordance with the invention claimed in any one of claims 32 to 34, 37, 38, 41 and 42 of the present application, for example, under the condition where the enciphered digital information data are the enciphered HD signal, since the information data generating portion is provided for sending one or both of the line number data varying at each line period of the enciphered HD signal and the frame number data varying at each frame period of the enciphered HD signal and the operation processing portion is also provided for subjecting the enciphered HD signal and one or both of the line number data varying at each line period of the enciphered HD signal and the frame number data varying at each frame period of the enciphered HD signal to the operation process to produce the modified HD signal and supplying the modified HD signal to the deciphering portion to which the key data are supplied, the deciphering process to which the enciphered HD signal, which is obtained by subjecting the HD signal to the enciphered process for improving the cipher strength, is subjected is appropriately carried out in response to the key date to reproduce the original HD signal.

The invention claimed is:

1. An apparatus for enciphering data comprising:
   a cipher producing portion for subjecting input data to enciphering process in accordance with rules determined by key data to produce cipher data;
   an enciphering portion for subjecting digital information data to enciphering process responding to one of random number data and pseudo-random number data produced on the basis of the cipher data obtained from the cipher producing portion to produce enciphered digital information data;
   a data supplying portion for producing the input data for the cipher producing portion with initial value data supplied thereto and supplying the cipher producing portion with the produced input data; and an initial value data supplying portion for supplying initial value data which vary at each data partition of the digital information data supplied to the enciphering portion to the data supplying portion, wherein the initial value data include both of line number data which vary at each line of the digital information data and frame number data which vary at each frame of the digital information data, and wherein the random number data and pseudo-random number data produced on the basis of the cipher data are different for each data partition of the digital information data.

2. An apparatus for enciphering data according to claim 1, wherein the initial value data supplying portion is operative to extract the information data which vary at each data partition of the digital information data from the digital information data.

3. An apparatus for enciphering data according to claim 2, wherein, the enciphering portion is supplied with a digital video signal as the digital information data and the initial value data supplying portion is operative to extract line number data from the digital video signal and supply the data supplying portion with the extracted line number data as the initial value data.

4. An apparatus for enciphering data comprising:
a data inserting portion for inserting information data which vary at each data partition of digital information data into the digital information data to produce modified digital information data;
a cipher producing portion for subjecting input data to enciphering process in accordance with rules determined by key data to produce cipher data;
an enciphering portion for subjecting the modified digital information data obtained from the data inserting portion to enciphering process responding to one of random number data and pseudo-random number data produced on the basis of the cipher data obtained from the cipher producing portion to produce enciphered digital information data;
a data supplying portion for producing the input data for the cipher producing portion with initial value data supplied thereto and supplying the cipher producing portion with the produced input data; and
an initial value data supplying portion for extracting initial value data from the modified digital information data obtained from the data inserting portion and supplying the initial value data to the data supplying portion,
wherein the initial value data include both of line number data which vary at each line of the digital information data and frame number data which vary at each frame of the digital information data, and
wherein the random number data and pseudo-random number data produced on the basis of the cipher data are different for each data partition of the digital information data.

5. An apparatus for enciphering data according to claim 4, wherein the data inserting portion is supplied with a digital video signal as the digital information data and operative to insert frame number data varying at each frame period of the digital video signal into the digital video signal to produce a modified digital video signal as the modified digital information data, and
the initial value data supplying portion is operative to extract the frame number data from the modified digital video signal obtained from the data inserting portion and supply the data supplying portion with the extracted frame number data as the initial value data.

6. An apparatus for enciphering data comprising:
a data inserting portion for inserting information data which vary at each first data partition of digital information data into the digital information data to produce modified digital information data;
a cipher producing portion for subjecting input data to enciphering process in accordance with rules determined by key data to produce cipher data;
an enciphering portion for subjecting the modified digital information data obtained from the data inserting portion to enciphering process responding to one of random number data and pseudo-random number data produced on the basis of the cipher data obtained from the cipher producing portion to produce enciphered digital information data;
a data supplying portion for producing the input data for the cipher producing portion with initial value data supplied thereto and supplying the cipher producing portion with the produced input data;
a first initial value data supplying portion for extracting first initial value data from the modified digital information data obtained from the data inserting portion and supplying the first initial value data to the data supplying portion; and
a second initial value data supplying portion for extracting second initial value data from the modified digital information data obtained from the data inserting portion and supplying the second initial value data to the data supplying portion,
wherein the first initial value data are line number data which vary at each line of the digital information data and the second initial value data are frame number data which vary at each frame of the digital information data, and
wherein the random number data and pseudo-random number data produced on the basis of the cipher data are different for each data partition of the digital information data.

7. An apparatus for enciphering data according to claim 6, wherein the data inserting portion is supplied with a digital video signal as the digital information data and operative to insert frame number data varying at each frame period of the digital video signal into the digital video signal to produce a modified digital video data as the modified digital information data,
the first initial value data supplying portion is operative to extract the frame number data from the modified digital video signal obtained from the data inserting portion and supplying the data supplying portion with the extracted frame number data as the initial value data, and
the second initial value data supplying portion is operative to extract line number data from one of the digital video signal supplied to the data inserting portion and the modified digital video signal obtained from the data inserting portion and supplying the data supplying portion with the extracted line number data as the initial value data.

8. An apparatus for enciphering data comprising:
a key data generating portion for sending key data;
an enciphering portion for subjecting digital information data to enciphering process responding to modified key data based on the key data sent from the key data generating portion to produce enciphered digital information data;

an information data generating portion for sending information data which vary at each data partition of the digital information data supplied to the enciphering portion; and an operation processing portion for subjecting the key data sent from the key data generating portion and the information data sent from the information data generating portion to operation process to produce the modified key data to be supplied to the enciphering portion, wherein the modified key data is produced on the basis of initial value data which vary at each data partition of the digital information data, wherein the initial value data include both of line number data which vary at each line of the digital information data and frame number data which vary at each frame of the digital information data.

9. An apparatus for enciphering data according to claim 8, wherein the information data generating portion is operative to extract the information data which vary at each data partition of the digital information data from the digital information data supplied to the enciphering portion.

10. An apparatus for enciphering data according to claim 9, wherein the enciphering portion is supplied with a digital video signal as the digital information data and the information data generating portion is operative to extract line number data from the digital video signal.

11. An apparatus for enciphering data comprising:

an information data generating portion for sending information data which vary at each data partition of digital information data;

an operation processing portion for subjecting the digital information data and the information data sent from the information data generating portion to operation process to produce the modified digital information data;

a key data generating portion for sending key data; and an enciphering portion for subjecting the modified digital information data obtained from the operation processing portion to enciphering process responding to modified key data based on the key data sent from the key data generating portion to produce enciphered digital information data, wherein the modified key data is produced on the basis of initial value data which vary at each data partition of the digital information data wherein the initial value data include both of line number data which vary at each line of the digital information data and frame number data which vary at each frame of the digital information data.

12. An apparatus for enciphering data according to claim 11, wherein the information data generating portion is operative to extract the information data which vary at each data partition of the digital information data from the digital information data supplied to the enciphering portion and send the extracted information data.

13. An apparatus for enciphering data according to claim 12, wherein the enciphering portion is supplied with a digital video signal as the digital information data and the information data generating portion is operative to extract line number data from the digital video signal and send the extracted line number data.

14. An apparatus for enciphering data comprising:

a data inserting portion for inserting information data which vary at each data partition of digital information data into the digital information data to produce modified digital information data;

an information data generating portion for extracting the information data which vary at each data partition of the digital information data supplied to the data inserting portion from the modified digital information data obtained from the data inserting portion and sending the extracted information data;

a key data generating portion for sending key data;

an operation processing portion for subjecting the key data sent from the key data generating portion and the information data sent from the information data generating portion to operation process to produce modified key data and sending the modified key data; and an enciphering portion for subjecting the modified digital information data obtained from the data inserting portion to enciphering process responding to the modified key data sent from the operation processing portion to produce enciphered digital information data, wherein the modified key data is produced on the basis of initial value data which vary at each data partition of the digital information data, wherein the initial value data include both of line number data which vary at each line of the digital information data and frame number data which vary at each frame of the digital information data.

15. An apparatus for enciphering data according to claim 14, wherein the data inserting portion is supplied with a digital video signal as the digital information data and operative to insert frame number data varying at each frame period of the digital video signal into the digital video signal to produce a modified digital video data as the modified digital information data, and the information data generating portion is operative to extract the frame number data from the modified digital video signal obtained from the data inserting portion and send the extracted frame number data.

16. An apparatus for enciphering data comprising:

a data inserting portion for inserting information data which vary at each data partition of digital information data into the digital information data to produce first modified digital information data;

an information data generating portion for extracting the information data which vary at each data partition of the digital information data supplied to the data inserting portion from the first modified digital information data obtained from the data inserting portion and sending the extracted information data;

an operation processing portion for subjecting the first modified digital information data obtained from the data inserting portion and the information data sent from the information data generating portion to operation process to produce second modified digital information data;

a key data generating portion for sending key data; and an enciphering portion for subjecting the second modified digital information data obtained from the operation processing portion to enciphering process responding to modified key data based on the key data sent from the key data generating portion to produce enciphered digital information data, wherein the modified key data is produced on the basis of initial value data which vary at each data partition of the digital information data, wherein the initial value data include both of line number data which vary at each line of the digital information data and frame number data which vary at each frame of the digital information data.

17. An apparatus for enciphering data according to claim 16,
wherein the data inserting portion is supplied with a digital video signal as the digital information data and operative to insert frame number data varying at each frame period of the digital video signal into the digital video signal to produce a first modified digital video signal as the first modified digital information data, and
the information data generating portion is operative to extract the frame number data from the first modified digital video signal obtained from the data inserting portion and send the extracted frame number data.

18. An apparatus for enciphering data comprising:
a data inserting portion for inserting information data which vary at each first data partition of digital information data into the digital information data to produce modified digital information data;
a first information data generating portion for extracting the information data which vary at each first data partition of the digital information data supplied to the data inserting portion from the modified digital information data obtained from the data inserting portion and sending the extracted information data;
a second information data generating portion for extracting information data which vary at each second data partition of the digital information data supplied to the data inserting portion from the modified digital information data obtained from the data inserting portion and sending the extracted information data;
a key data generating portion for sending key data;
an operation processing portion for subjecting the key data sent from the key data generating portion and the information data sent from each of the first and second information data generating portions to operation process to produce modified key data and sending the modified key data; and
an enciphering portion for subjecting the modified digital information data obtained from the data inserting portion to enciphering process responding to the modified key data sent from the operation processing portion to produce enciphered digital information data,
wherein the modified key data is produced on the basis of initial value data which vary at each data partition of the digital information data,
wherein the initial value data include both of line number data which vary at each line of the digital information data and frame number data which vary at each frame of the digital information data.

19. An apparatus for enciphering data according to claim 18,
wherein the data inserting portion is supplied with a digital video signal as the digital information data and operative to insert frame number data varying at each frame period of the digital video signal into the digital video signal to produce a modified digital video signal as the modified digital information data,
the first information data generating portion is operative to extract the frame number data from the modified digital video signal obtained from the data inserting portion and send the extracted frame number data and
the second information data generating portion is operative to extract the line number data from one of the digital video signal supplied to the data inserting portion and the modified digital video signal obtained from the data inserting portion and send the extracted line number data.

20. An apparatus for enciphering data comprising:
a data inserting portion for inserting information data which vary at each first data partition of digital information data into the digital information data to produce first modified digital information data;
a first information data generating portion for extracting the information data which vary at each first data partition of the digital information data supplied to the data inserting portion from the first modified digital information data obtained from the data inserting portion and sending the extracted information data;
a second information data generating portion for extracting information data which vary at each second data partition of the digital information data supplied to the data inserting portion from the modified digital information data obtained from the data inserting portion and sending the extracted information data;
an operation processing portion for subjecting the first modified digital information data obtained from the data inserting portion and the information data sent from each of the first and second information data generating portions to operation process to produce second modified digital information data and sending the second modified digital information data;
a key data generating portion for sending key data; and
an enciphering portion for subjecting the second modified digital information data obtained from the operation processing portion to enciphering process responding to modified key data based on the key data sent from the key data generating portion to produce enciphered digital information data,
wherein the modified key data is produced on the basis of initial value data which vary at each data partition of the digital information data,
wherein the initial value data include both of line number data which vary at each line of the digital information data and frame number data which vary at each frame of the digital information data.

21. An apparatus for enciphering data according to claim 20,
wherein the data inserting portion is supplied with a digital video signal as the digital information data and operative to insert frame number data varying at each frame period of the digital video signal into the digital video signal to produce a first modified digital video signal as the first modified digital information data,
the first information data generating portion is operative to extract the frame number data from the first modified digital video signal obtained from the data inserting portion and send the extracted frame number data and
the second information data generating portion is operative to extract the line number data from one of the digital video signal supplied to the data inserting portion and the first modified digital video signal obtained from the data inserting portion and send the extracted line number data.

22. An apparatus for deciphering data comprising:
a cipher producing portion for subjecting input data to enciphering process in accordance with rules determined by key data to produce cipher data;
a deciphering portion for subjecting enciphered digital information data to deciphering process responding to one of random number data and pseudo-random number data produced on the basis of the cipher data obtained from the cipher producing portion to reproduce original digital information data;

a data supplying portion for producing the input data for the cipher producing portion with initial value data supplied thereto and supplying the cipher producing portion with the produced input data; and an initial value data supplying portion for supplying initial value data to the data supplying portion, wherein the initial value data include both of line number data which vary at each line of the digital information data and frame number data which vary at each frame of the digital information data, and wherein the random number data and pseudo-random number data produced on the basis of the cipher data are different for each data partition of the digital information data.

23. An apparatus for deciphering data according to claim 22, wherein the initial value data supplying portion is operative to extract the information data which vary at each data partition of the enciphered digital information data from the enciphered digital information data.

24. An apparatus for enciphering data according to claim 23, wherein the deciphering portion is supplied with an enciphered digital video signal as the enciphered digital information data and the initial value data supplying portion is operative to extract line number data from the enciphered digital video signal and supply the data supplying portion with the extracted line number data as the initial value data.

25. An apparatus for deciphering data comprising:

a cipher producing portion for subjecting input data to enciphering process in accordance with rules determined by key data to produce cipher data;

a deciphering portion for subjecting enciphered digital information data to enciphering process responding to random number data or pseudo-random number data produced on the basis of the cipher data obtained from the cipher producing portion to reproduce original digital information data;

a data supplying portion for producing the input data for the cipher producing portion with initial value data supplied thereto and supplying the cipher producing portion with the produced input data; and an initial value data supplying portion for extracting initial value data from the enciphered digital information data and supplying the initial value data to the data supplying portion, wherein the initial value data include both of line number data which vary at each line of the digital information data and frame number data which vary at each frame of the digital information data, and wherein the random number data and pseudo-random number data produced on the basis of the cipher data are different for each data partition of the digital information data.

26. An apparatus for enciphering data according to claim 25, wherein the deciphering portion is supplied with an enciphered digital video signal as the enciphered digital information data and the initial value data supplying portion is operative to extract frame number data from the enciphered digital video signal and supply the data supplying portion with the extracted frame number data as the initial value data.

27. An apparatus for deciphering data comprising:

a cipher producing portion for subjecting input data to enciphering process in accordance with rules determined by key data to produce cipher data;

a deciphering portion for subjecting enciphered digital information data to enciphering process responding to one of random number data and pseudo-random number data produced on the basis of the cipher data obtained from the cipher producing portion to reproduce original digital information data;

a data supplying portion for producing the input data for the cipher producing portion with initial value data supplied thereto and supplying the cipher producing portion with the produced input data;

a first initial value data supplying portion for extracting first initial value data from the enciphered digital information data and supplying the first initial value data to the data supplying portion; and a second initial value data supplying portion for extracting second initial value data from the enciphered digital information data and supplying the second initial value data extracted information data to the data supplying portion, wherein the first initial value data are line number data which vary at each line of the digital information data and the second initial value data are frame number data which vary at each frame of the digital information data, and wherein the random number data and pseudo-random number data produced on the basis of the cipher data are different for each data partition of the digital information data.

28. An apparatus for enciphering data according to claim 27, wherein the deciphering portion is supplied with an enciphered digital video signal as the enciphered digital information data, the first initial value data supplying portion is operative to extract frame number data from the enciphered digital video signal and supply the data supplying portion with the extracted frame number data as the initial value data and the second initial value data supplying portion is operative to extract line number data from the enciphered digital video signal and supply the data supplying portion with the extracted line number data as the initial value data.

29. An apparatus for deciphering data comprising:

a key data generating portion for sending key data;

a deciphering portion for subjecting enciphered digital information data to deciphering process responding to modified key data based on the key data sent from the key data generating portion to reproduce original digital information data;

an information data generating portion for sending information data which vary at each data partition of the enciphered digital information data supplied to the deciphering portion; and an operation processing portion for subjecting the key data sent from the key data generating portion and the information data sent from the information data generating portion to operation process to produce the modified key data to be supplied to the deciphering portion, wherein the modified key data is produced on the basis of initial value data which vary at each data partition of the digital information data, wherein the initial value data include both of line number data which vary at each line of the digital information data and frame number data which vary at each frame of the digital information data.

30. An apparatus for deciphering data according to claim 29, wherein the information data generating portion is operative to extract the information data which vary at each data partition of the enciphered digital information data from the enciphered digital information data.

31. An apparatus for enciphering data according to claim 30, wherein the deciphering portion is supplied with an enciphered digital video signal as the enciphered digital information data and the information data generating portion is operative to extract line number data from the enciphered digital video signal.

32. An apparatus for deciphering data comprising:
an information data generating portion for sending information data which vary at each data partition of enciphered digital information data;
an operation processing portion for subjecting the enciphered digital information data and the information data sent from the information data generating portion to operation process to produce the modified enciphered digital information data;
a key data generating portion for sending key data; and
a deciphering portion for subjecting the modified enciphered digital information data obtained from the operation processing portion to deciphering process responding to modified key data based on the key data sent from the key data generating portion to reproduce original digital information data,
wherein the modified key data is produced on the basis of initial value data which vary at each data partition of the digital information data,
wherein the initial value data include both of line number data which vary at each line of the digital information data and frame number data which vary at each frame of the digital information data.

33. An apparatus for deciphering data according to claim 32, wherein the information data generating portion is operative to extract the information data which vary at each data partition of the enciphered digital information data from the enciphered digital information data supplied to the operation processing portion and send the extracted information data.

34. An apparatus for enciphering data according to claim 33, wherein the operation processing portion is supplied with an enciphered digital video signal as the enciphered digital information data and the information data generating portion is operative to extract line number data from the enciphered digital video signal and send the extracted line number data.

35. An apparatus for deciphering data comprising:
an information data generating portion for extracting information data which vary at each data partition of enciphered digital information data and sending the extracted information data;
a key data generating portion for sending key data;
an operation processing portion for subjecting the key data sent from the key data generating portion and the information data sent from the information data generating portion to operation process to produce modified key data and sending the modified key data; and
a deciphering portion for subjecting the enciphered digital information data supplied to the information data generating portion to deciphering process responding to the modified key data sent from the operation processing portion to reproduce original digital information data,
wherein the modified key data is produced on the basis of initial value data which vary at each data partition of the digital information data,
wherein the initial value data include both of line number data which vary at each line of the digital information data and frame number data which vary at each frame of the digital information data.

36. An apparatus for enciphering data according to claim 35, wherein the information data generating portion is supplied with an enciphered digital video signal as the enciphered digital information data and operative to extract frame number data from the enciphered digital video signal and send the extracted frame number data.

37. An apparatus for deciphering data comprising:
an information data generating portion for extracting information data which vary at each data partition of enciphered digital information data and sending the extracted information data;
an operation processing portion for subjecting the enciphered digital information data obtained and the information data sent from the information data generating portion to operation process to produce modified enciphered digital information data;
a key data generating portion for sending key data; and
a deciphering portion for subjecting the modified enciphered digital information data obtained from the operation processing portion to deciphering process responding to modified key data based on the key data sent from the key data generating portion to produce original digital information data,
wherein the modified key data is produced on the basis of initial value data which vary at each data partition of the digital information data,
wherein the initial value data include both of line number data which vary at each line of the digital information data and frame number data which vary at each frame of the digital information data.

38. An apparatus for enciphering data according to claim 37, wherein the information data generating portion is supplied with an enciphered digital video signal as the enciphered digital information data and operative to extract frame number data from the enciphered digital video signal and send the extracted frame number data.

39. An apparatus for deciphering data comprising:
a first information data generating portion for extracting information data which vary at each first data partition of enciphered digital information data and sending the extracted information data;
a second information data generating portion for extracting information data which vary at each second data partition of the enciphered digital information data supplied to the first information data generating portion and sending the extracted information data;
a key data generating portion for sending key data;
an operation processing portion for subjecting the key data sent from the key data generating portion and the information data sent from each of the first and second information data generating portions to operation process to produce modified key data and sending the modified key data; and
a deciphering portion for subjecting the enciphered digital information data supplied to the first and second information data generating portions to deciphering process responding to the modified key data sent from the operation processing portion to reproduce original digital information data, wherein the modified key data is produced on the basis of initial value data which vary at each data partition of the digital information data, wherein the initial value data include both of line number data which vary at each line of the digital information data and frame number data which vary at each frame of the digital information data.

40. An apparatus for enciphering data according to claim 39, wherein the first information data generating portion is supplied with an enciphered digital video signal as the enciphered digital information data and operative to extract frame number data from the enciphered digital video signal and send the extracted frame number data, and the second information data generating portion is operative to extract line number data from the enciphered digital video signal and send the extracted line number data.

41. An apparatus for deciphering data comprising:

a first information data generating portion for extracting information data which vary at each first data partition of enciphered digital information data and sending the extracted information data;

a second information data generating portion for extracting information data which vary at each second data partition of the enciphered digital information data supplied to the first information data generating portion from the enciphered digital information data and sending the extracted information data;

an operation processing portion for subjecting the enciphered digital information data supplied to the first and second information data generating portions and the information data sent from each of the first and second information data generating portions to operation process to produce modified enciphered digital information data and sending the modified enciphered digital information data;

a key data generating portion for sending key data; and a deciphering portion for subjecting the modified enciphered digital information data obtained from the operation processing portion to deciphering process responding to modified key data based on the key data sent from the key data generating portion to reproduce original digital information data, wherein the modified key data is produced on the basis of initial value data which vary at each data partition of the digital information data, wherein the initial value data include both of line number data which vary at each line of the digital information data and frame number data which vary at each frame of the digital information data.

42. An apparatus for enciphering data according to claim 41, wherein the first information data generating portion is supplied with an enciphered digital video signal as the enciphered digital information data and operative to extract frame number data from the enciphered digital video signal and send the extracted frame number data, and the second information data generating portion is operative to extract line number data from the enciphered digital video signal and send the extracted line number data.

* * * * *